(12) United States Patent
Yamagami

(10) Patent No.: US 6,458,032 B1
(45) Date of Patent: Oct. 1, 2002

(54) THREE-DIMENSIONAL PUZZLE GAME DEVICE AND RECORDING MEDIUM FOR THREE-DIMENSIONAL PUZZLE GAME

(75) Inventor: Hitoshi Yamagami, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/489,201

(22) Filed: Jan. 21, 2000

(30) Foreign Application Priority Data

Jul. 30, 1999 (JP) .......................................... 11-216298

(51) Int. Cl.⁷ ............................................... A63F 13/00
(52) U.S. Cl. .............................. 463/9; 463/30; 463/32; 273/153 R
(58) Field of Search ............................ 463/7, 9, 30, 31, 463/32; 273/155 R, 153 G

(56) References Cited

U.S. PATENT DOCUMENTS

| | | | |
|---|---|---|---|
| 5,265,888 A | * 11/1993 | Yamamoto et al. | 273/434 |
| 5,312,113 A | * 5/1994 | Ta-Hsien et al. | 273/434 |
| 5,643,978 A | 7/1997 | Aityan et al. | 463/9 |
| 5,921,548 A | * 7/1999 | Goldberg | 273/157 R |
| 6,062,978 A | 5/2000 | Martino et al. | 463/9 |
| 6,093,104 A | * 7/2000 | Kasahara et al. | 463/30 |
| 6,237,914 B1 | * 5/2001 | Saltanov et al. | 273/157 R |
| 6,256,040 B1 | * 7/2001 | Tanaka et al. | 345/421 |

OTHER PUBLICATIONS

David Weaver, the gaming Intelligence Agency, 1996, Tetris Attack, internet search.*
Welltris, 1989 3D tetris, Internet Search.*

* cited by examiner

*Primary Examiner*—Jessica Harrison
*Assistant Examiner*—John M Hotaling, II
(74) *Attorney, Agent, or Firm*—Nixon & Vanderhye P.C.

(57) ABSTRACT

In this puzzle game device, a three-dimensional game field 70 laterally extended around a tubular subject is provided. The 3D game field 70 is divided into display regions of vertically 12 lines by circumferentially 16 columns, and each display region is capable of displaying a panel. A player can move the panels displayed on the game field 70 with a cursor 71. The panels are varied in pattern, and when three or more panels of a pattern being vertically or laterally in line, those panels are eliminated. The 3D game field 70 has new panels continuously rising, therefore the player is required to unceasingly eliminate the panels. When the player fails to eliminate panels quick enough and the panels reach the top of the 3D game field 70, the game is over. By applying the 3D game field 70 as an alternative to a conventional 2D game field, the degree of freedom and the level of variety of a game are enhanced by the up-scaled game field.

45 Claims, 18 Drawing Sheets

FIG. 6
(a) 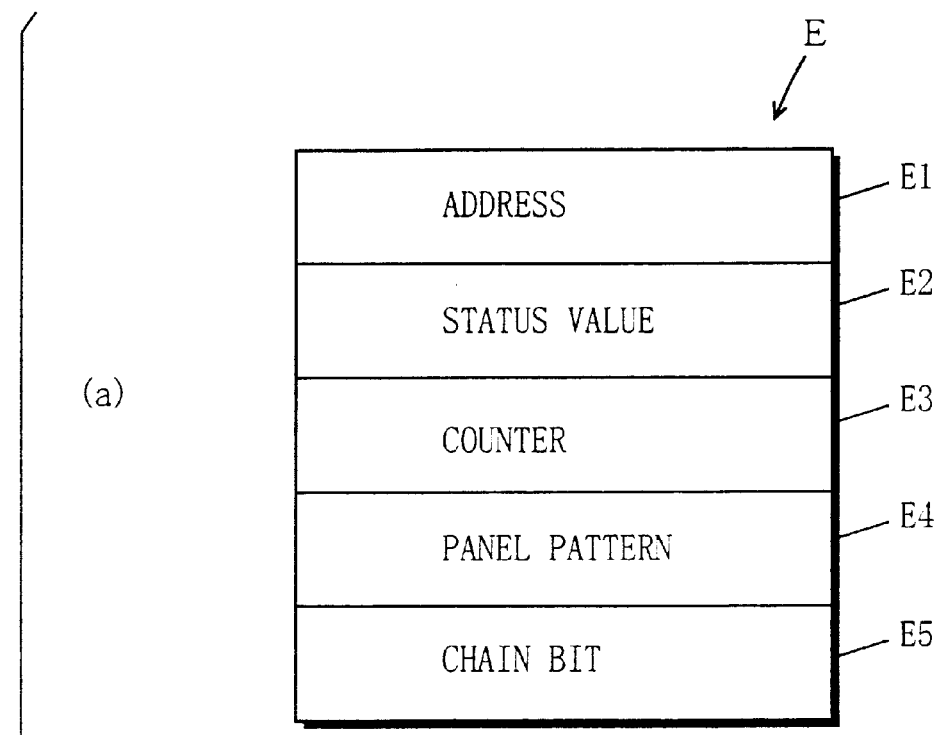
(b) 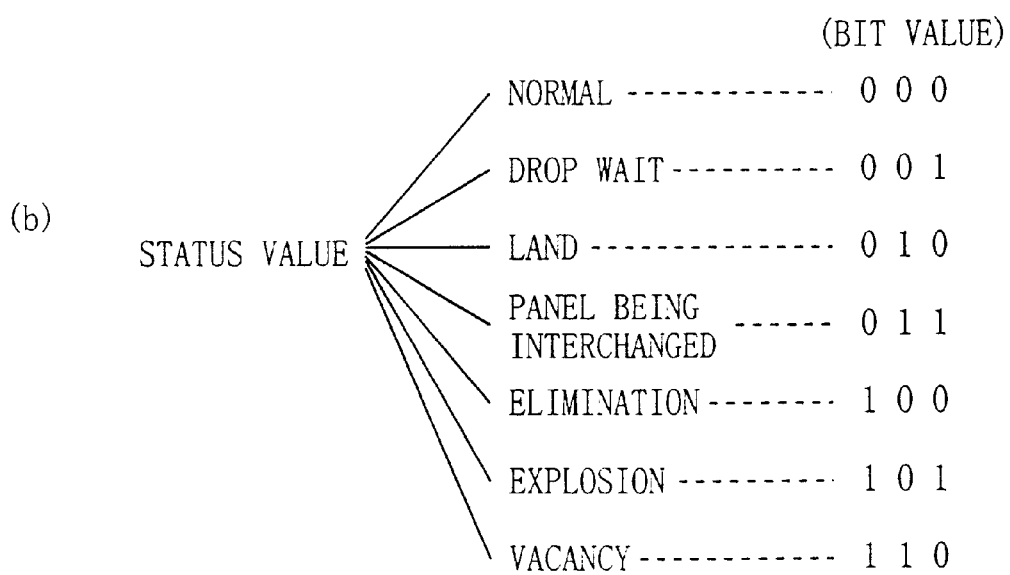

F I G. 1 6
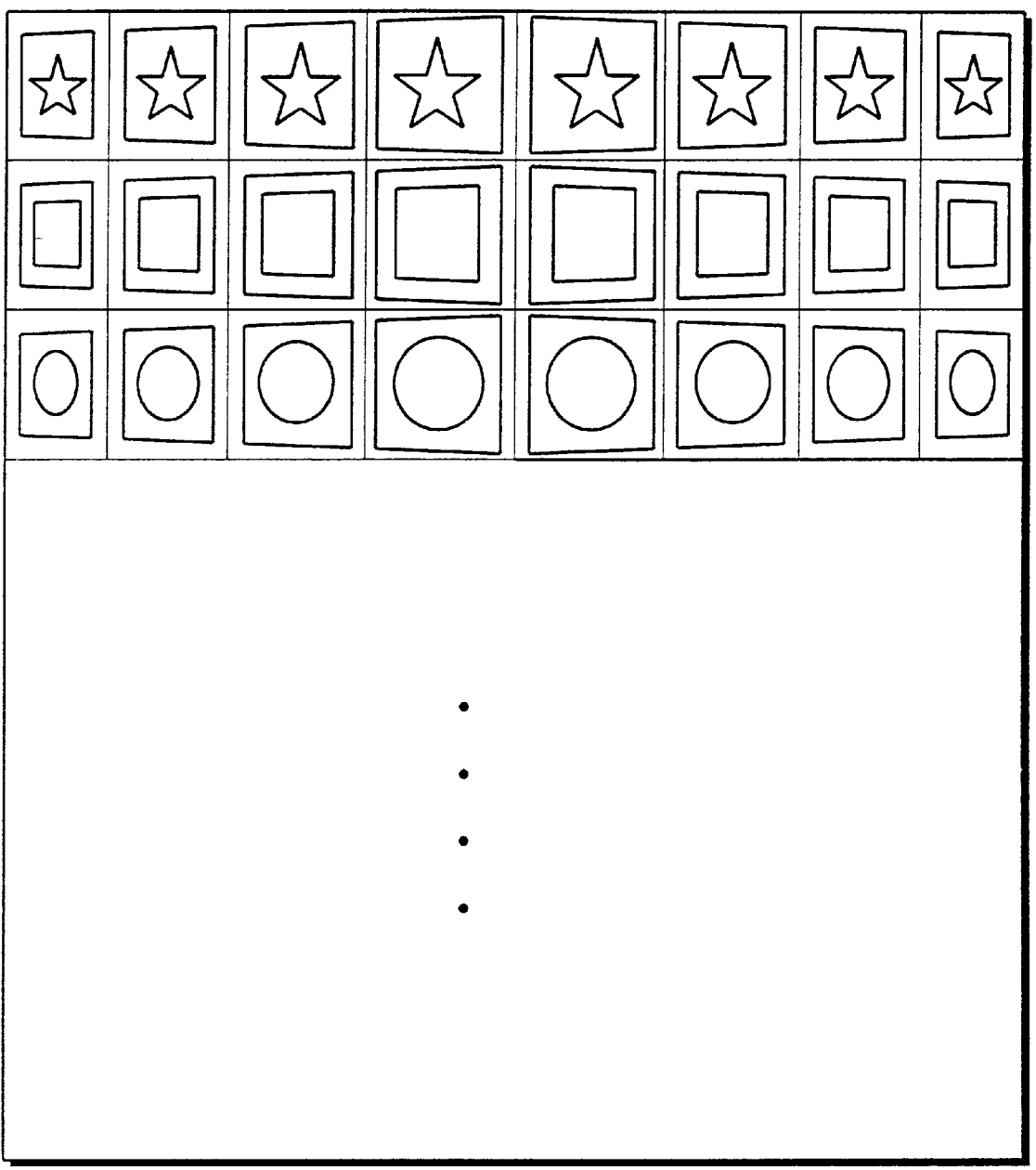

THREE-DIMENSIONAL PUZZLE GAME DEVICE AND RECORDING MEDIUM FOR THREE-DIMENSIONAL PUZZLE GAME

BACKGROUND OF THE INVENTION

1. Field of the Invention

The present invention relates to 3D puzzle game devices and 3D puzzle game recording media, and more particularly, to a 3D puzzle game device and a 3D puzzle game recording medium of a type in which the game proceeds as a player takes any predetermined action for a plurality of puzzle elements displayed on a 3D game field spreading across a display screen.

2. Description of the Background Art

The selection of video games appearing until now on the market is pretty much diversified, but can be categorized in terms of similarity in game contents. One of the categories is puzzle games. One of the many TV games falling under this category is, for example, game software named "Panel de Pon (phonetically written)" for a video game device "Super Family Computer" which is manufactured, distributed, and was put on the market in the fall of 1995 by the applicant of this application. Hereinafter, the description is made of a conventional puzzle game while referring to "Panel de Pon" as a typical example.

In "Panel de Pon," a rectangular game field spreading across a two-dimensional plane is provided for a player to play a game thereon. On the game field, 72 pieces (12 high by 6 wide=72 pieces) of panels can be displayed as objects to be eliminated (hereinafter, referred to as puzzle elements). The player can move the panels displayed on the game field with a cursor. The panels are varied in pattern, and when three or more panels of a pattern become vertically or laterally in line, those panels are eliminated. Panels which have been located above those eliminated panels accordingly drop, and if three or more panels of a pattern become in line thereby, those panels are sequentially eliminated (referred to as chaining). The game field has new panels continuously rising, and therefore the player is required to unceasingly eliminate the panels. When the player fails to eliminate panels quickly enough and the panels reach the top of the game field, the game is over.

Such puzzle games have a variety of types. The puzzle elements are not limited to panels but may be capsules, geometric blocks, characters, or the like. Also, such puzzle elements may drop, or an elimination condition may be different to a degree from that in "Panel de Pon".

In any case, every conventional puzzle game is provided with a game field spreading across a 2D plane. Further, the game field is set to be sufficiently small for a single screen of the television. Therefore, in the conventional puzzle game, the area of the game field displayable on a single screen becomes inevitably smaller, and the number of puzzle elements displayable thereon becomes resultantly less. Consequently, the degree of freedom and the level of variety of a game is impaired.

SUMMARY OF THE INVENTION

Therefore, an object of the present invention is to provide a puzzle game device in which a game field is up-scaled and accordingly the degree of freedom and the level of variety of a game can be enhanced.

The present invention has the following features to attain the object above.

A first aspect of the present invention is directed to a three-dimensional puzzle game device in which a game proceeds as a player takes an action predetermined for puzzle elements varied in pattern displayed on a game field spreading across a display screen, the 3D puzzle game device comprising:

a controller which is actuated by the player; and an image processing part for effecting program processing for a 3D puzzle game in response to actuation of the controller, and then producing image data for the 3D puzzle game for display on a display, wherein the image processing part comprises:

a 3D game field display control part for producing a 3D game field laterally extending around a tubular subject for display on the display;

a puzzle element display control part for displaying a plurality of puzzle elements varied in pattern on the 3D game field displayed on the display;

a location change part for changing, in response to the actuation of the controller, location of the puzzle elements displayed on the 3D game field;

a 3D game field rotation part for rotating, in response to the actuation of the controller, the 3D game field along with the puzzle elements displayed thereon;

an elimination condition detection part for detecting that the location of the puzzle elements displayed on the 3D game field satisfies a given elimination condition; and an elimination control part for performing a control in such a manner that the puzzle elements displayed on the 3D game field are eliminated when satisfying the elimination condition.

As described above, in the first aspect, a game field is the 3D game field laterally extended around the tubular subject. Therefore, the degree of freedom and the level of variety of a game are enhanced by the up-scaled game field as compared to the conventional 2D puzzle games. Further, because the game proceeds not only in the front but at the back, the game can be sophisticated with a long-lasting appeal.

In the later-described embodiment, the location of the puzzle elements frozen on the 3D game field is changed in response to the actuation of the controller. During the game, additional puzzle elements are sequentially produced and are displayed on the 3D game field. In this case, those additional puzzle elements are gradually moved to a predetermined direction. The location of the puzzle elements on the move can be changed in response to the actuation of the controller. On the 3D game field, when the puzzle elements of a pattern are in line in a predetermined direction over a fixed number, the elimination condition is detected as being satisfied and thus those panels are eliminated.

The patterns of the puzzle elements are typically distinct from one another by color or design provided thereon. Also, the patterns of the puzzle elements can be varied by shapes thereof, which are structured by plurally combining a minimum unit of shape.

Further, the patterns of the puzzle elements can be varied by lines drawn thereon. If this is the case, when the lines drawn on the puzzle elements on said 3D game field are forming a line going around the 3D game field, the elimination condition is detected as being satisfied and then those panels are eliminated.

A second aspect of the present invention is directed to a recording medium on which a program to be run by the image processing part provided in the 3D puzzle game device as described in the first aspect is recorded. The program realizes an operation environment on the 3D puzzle game device when executed by the image processing part, and comprises: a step of displaying a 3D game field laterally extending around a tubular subject on the display; a step of displaying puzzle elements varied in pattern on the 3D game field; a step of changing, in response to the actuation of the controller, the location of the puzzle elements on the 3D game field; a step of rotating, in response to the actuation of the controller, the 3D game field along with the puzzle elements displayed thereon; a step of detecting the location of the puzzle elements on the 3D game field satisfying a given elimination condition; and a step of performing a control in such a manner that the puzzle elements displayed on the 3D game field are eliminated when satisfying the elimination condition.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6a and 6b are diagrams showing the structure of each entry of the 2D field table;

FIG. 16 is a diagram showing a parts table;

DESCRIPTION OF THE PREFERRED EMBODIMENTS

Figure 1:
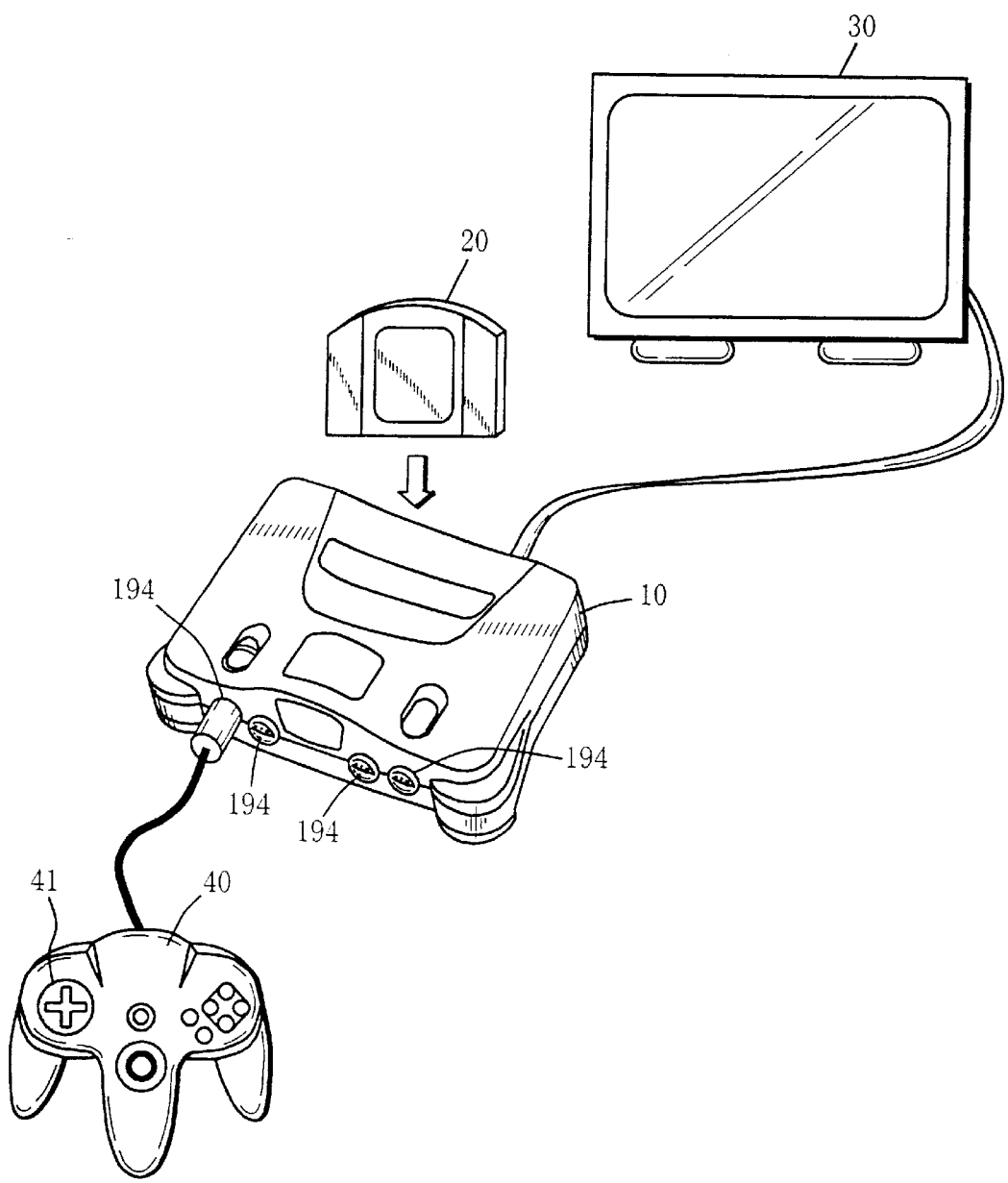
FIG. 1 is an outer view of a video game system according to an embodiment of the present invention.

FIG. 1 is an outer view of a video game system according to an embodiment of the present invention. In FIG. 1, the video game system of this embodiment is provided with a video game body 10, a ROM cartridge 20 to be attached to the video game body 10, a television receiver 30 to be connected to the video game body 10, and a controller 40 also to be connected to the video game body 10.

The ROM cartridge 20 as an exemplary external recording medium includes an external ROM, into which data relevant to games such as game program or character data is fixedly stored, and is configured to be detachable with respect to the video game body 10. The controller 40 is structured by a housing shaped to be grasped with one or both hand(s) and a plurality of switches provided thereon. The switches each functions in an arbitrary manner as is defined for every game program. For the external recording medium, other types of recording media such as CD-ROM or DVD may be used in addition to the ROM cartridge 20 or as an alternative thereto.

Figure 2:
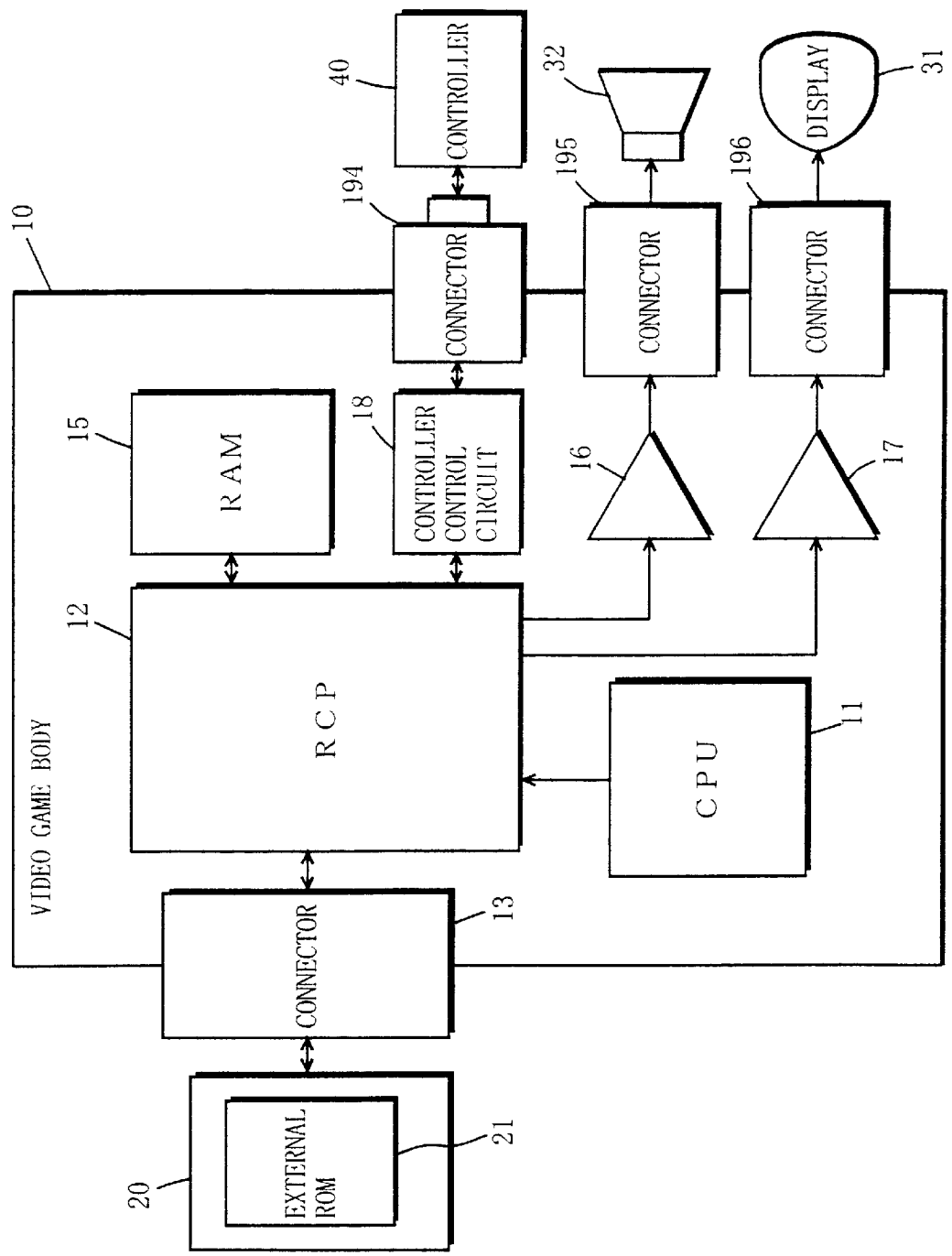
FIG. 2 is a block diagram showing the electrical configuration of the video game system shown in FIG. 1.

FIG. 2 is a block diagram showing the electrical configuration of the video game system shown in FIG. 1. In FIG. 2, the video game body 10 includes a Central Processing Unit (hereinafter, referred to simply as "CPU") 11 and a Reality Coprocessor (hereinafter, referred to simply as "RCP") 12. To the RCP 12, a cartridge connector 13 for detachably attaching the ROM cartridge 20 thereto and a RAM 15 are connected. An audio signal generation circuit 16 for outputting an audio signal processed in the CPU 11 and an image signal generation circuit 17 for outputting an image signal processed in the CPU 11 are connected to the RCP 12. A controller control circuit 18 for serially transferring operation data of one or more controllers is also connected to the RCP12.

The RCP 12 is a signal processing circuit receiving a higher-order instruction from the CPU 11 and performing various types of processing corresponding thereto (e.g., polygon coordinate transformation, shading processing, image processing for rastering polygon data to an image to be displayed and converting the polygon data into a data format (dot data) storable in a frame memory, or interface processing between the CPU 11 and 10 the RAM 15, and between the CPU 11 and the controller control circuit 18). The RAM 15 temporarily stores data and program to-be-processed and/or processed by the CPU 11.

A connector 195 provided at the rear of the video game body 10 is connected to an output part of the audio signal generation circuit 16. A connector 196 provided at the rear of the video game body 10 is connected to an output part of the image signal generation circuit 17. A speaker 32 housed in the television receiver 30 is detachably connected to the connector 195. A display 31 such as a CRT housed in the television receiver 30 is detachably connected to the connector 196.

One or more (four in FIG. 1) controller connectors (hereinafter, simply preferred to as "connectors") 194 provided at the front of the video game body 10 are connected to the controller control circuit 18. A controller 40 can be detachably connected via a connecting jack to each of the connectors 194. When connected to the connector 194, the controller 40 is electrically connected to the video game body 10, and thus is able to receive/transmit and transfer data thereto/therefrom.

Figure 3:
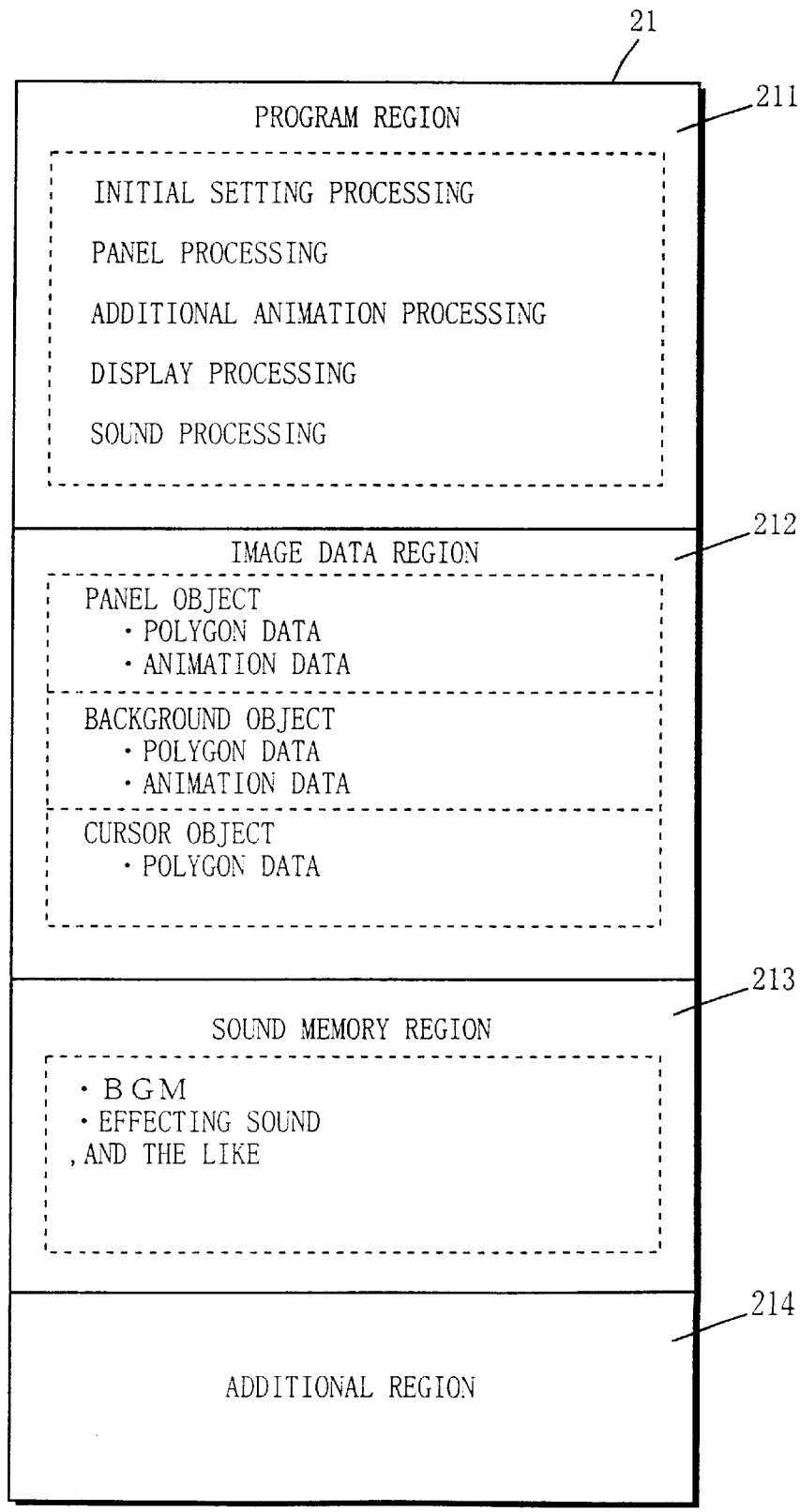
FIG. 3 is a memory map illustrating a memory space possessed by an external ROM 21 shown in FIG. 2.

FIG. 3 is a memory map illustrating a memory space possessed by the external ROM 21. In FIG. 3, the external ROM 21 has a memory region structured by a program region 211, an image data region 212, a sound memory region 213, and an additional region 214.

The program region 211 stores program data for executing various types of processing necessary for the game. In detail, the program region 211 fixedly stores in advance an operating program of the CPU 11 (program for effecting processing corresponding to later-described flowcharts in FIGS. 7 to 15). The image data region 212 stores data for displaying panel, background and cursor, for example. The sound memory region 213 stores sound data such as BGM and sound effects, for example. The additional region 214 stores additional data necessary for the game to proceed.

Figure 4:
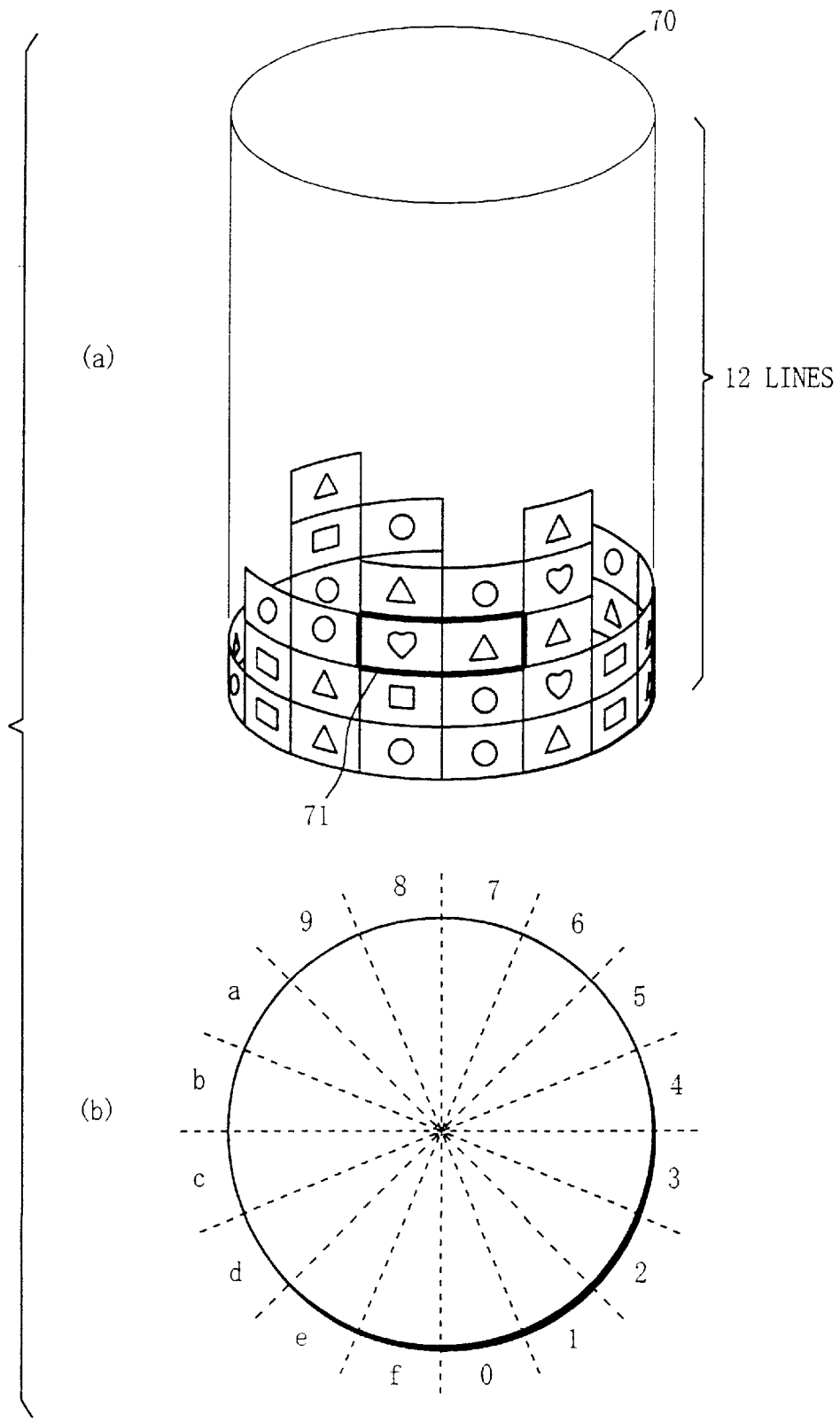
FIGS. 4a and 4b are diagrams for illustrating a 3D game field applied in the video game system of the embodiment of the present invention.

FIG. 4 is a diagram for illustrating a 3D game field applied to the video game system of this embodiment. In this embodiment, the game field provided for the player is a 3D subject surface. To be more specific, as shown in FIG. 4(a), a 3D game field 70 is laterally extended around a cylindrical 3D subject. The player plays the game with respect to the 3D game field 70 in FIG. 4(a). The 3D game field 70 is divided vertically by 12 lines and circumferentially by 16 columns (see also FIG. 4(b)) into display regions, and each display region is capable if displaying a panel. The player can move the panels displayed on the 3D game field 70 with a cursor 71. The panels are varied in pattern, and when three or more panels of a pattern are vertically or laterally in line, those panels are eliminated. Panels which have been located above those eliminated panels accordingly drop one line below, and if three or more panels of a pattern become in line thereby, those panels are sequentially eliminated (referred to as chaining). The 3D game field 70 has new panels continuously rising, and therefore the player is required to unceasingly eliminate the panels. When the player fails to eliminate panels quickly enough and the panels reach the top of the 3D game field 70, the game is over.

Figure 5:
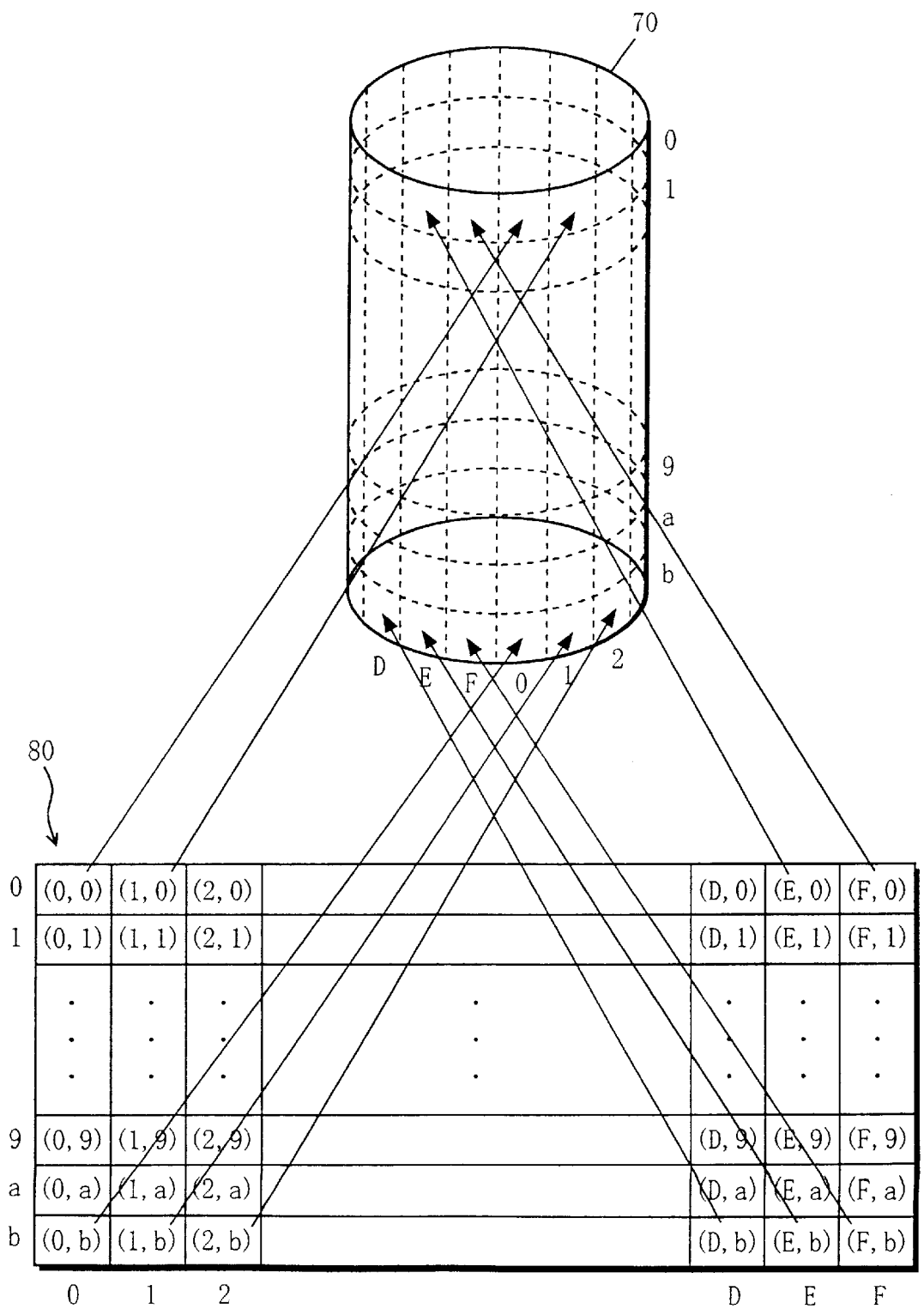
FIG. 5 is a diagram showing the correspondence between a 2D field table and display regions of a 3D game field.

In accordance with program data stored in the external ROM 21 (stored in the program region 211 in FIG. 3), the CPU 11 in FIG. 2 develops, on the RAM 15, a 2D field table corresponding to the display regions of the 3D game field 70. FIG. 5 is a diagram showing the correspondence between the 2D field table and the display regions of the 3D game field 70. In FIG. 5, a 2D field table 80 is structured by spreading the 3D game field 70 across a 2D plane, and is provided with a plurality of entries (or registration areas) each corresponding to one of the display regions of the 3D game field 70. In FIG. 5, the bracketed numbers in the entries each denote an address number, and the address number indicates a column number and a line number of one display region of the 3D game field 70.

Hereinafter, by referring to FIG. 6, the structure of the entry is described in detail. FIG. 6(a) is a diagram showing the structure of an exemplary entry of the 2D field table 80. In FIG. 6(a), an entry E includes an address E1, a status value E2, a counter E3, a panel pattern E4, and a chain bit E5. The address E1 indicates the location of the entry on the 2D field table 80 with the line number (0 to 9, a, b) and the column number (0 to 9, A to F), and corresponds to one of the display regions of the 3D game field 70. The status value E2 indicates the status of the panel displayed on the corresponding display region of the 3D game field 70. More specifically, as shown in FIG. 6(b), the status value E2 indicates in which status the panel is, i.e., normal, drop wait, land, being interchanged, elimination, explosion, and vacancy. The counter E3 is a time counter to measure time for various purposes. The panel pattern E4 indicates a panel pattern to be displayed. The panel pattern is determined by color or design, or combination thereof, and an area where no panel is observed is considered as being a see-through panel so that a panel opposing thereto (panel located on the back of the cylinder) can be visible therethrough. More preferably, to easily distinguish between a panel at the front (the side before the player) and a panel at the rear if these panels are of a pattern, the panel at the rear is changed into slightly-smoky color. The chain bit E5 indicates whether or not the panel corresponding thereto is in the chaining status.

Next, by referring to the flowcharts in FIGS. 7 to 15, the operation of the video game system of this embodiment is described. First, by referring to the main routine in FIG. 7, the comprehensive operation is described. When the game body 10 is switched on, the CPU 11 first effects the initial setting operation (step S101). In the initial setting operation, the 2D field table 80 shown in FIG. 5 is developed in the RAM 15, and then the entries of the 2D field table 80 are each provided with a predetermined default value. For example, according to previously-programmed data, the data E1 to E5 for displaying panels at the start of the game, as in FIG. 4(a), is written into corresponding entries of the 2D field table 80. In this case, the data E1 to E5 corresponding to each entry is set according to random number data so as to vary the degree of difficulty of the game by increasing the number of panels as the game proceeds stage by stage, and more preferably to vary the panel patterns in the same stage. A parts table as shown in FIG. 16 is also developed in the RAM 15. In the parts table, a plurality of display data is registered in a predetermined format (e.g., bit map format) for every panel pattern. Herein, the 3D game field 70 applied to this embodiment is laterally extended around the cylindrical subject in a curving manner, therefore the panels are in visually different shapes depending on which column the panels are located. Specifically, the panel in the vicinity of the front is almost rectangular, and becomes flatter as the distance from the front gets farther. Accordingly, in the parts table, display data which indicates the panel shapes differ according to the columns is registered for every panel pattern. The CPU 11 then reads the display data from the parts table, and places the data on the corresponding display region of the 3D game field 70 for display of the panel.

In the program data stored in the external ROM 21 (stored in the program region 211 in FIG. 3), basic display data (e.g., display data of panel located in the front column) to the plurality of display data registered in the parts table in FIG. 16 is written, and the CPU 11 processes the basic display data to produce display data for every column. In this manner, the display data is significantly compressed and accordingly the storage capacity of the external ROM 21 is saved as much.

Next, the CPU 11 effects the panel processing (step S102). In the panel processing, the panels are subjected to various types of processing. The details thereof are described later. The CPU 11 then effects the additional animation processing (step S103). The additional animation processing is processing executed to display background or score through the animation processing. Thereafter, the CPU 11 effects the panel display processing (step S104). The details thereof are described later. Thereafter, the CPU 11 effects the sound processing (step S105). In the sound processing, data of BGM or sound effects is produced according to the data stored in the sound memory region 213 in FIG. 3, and accordingly the speaker 32 housed in the television receiver 30 outputs sound corresponding thereto. Herein, in the main routine shown in FIG. 7, one cycle thereof is executed in one field period. That is, a series of processing shown in FIG. 7 never fails to be executed in one single field period.

Figure 7:
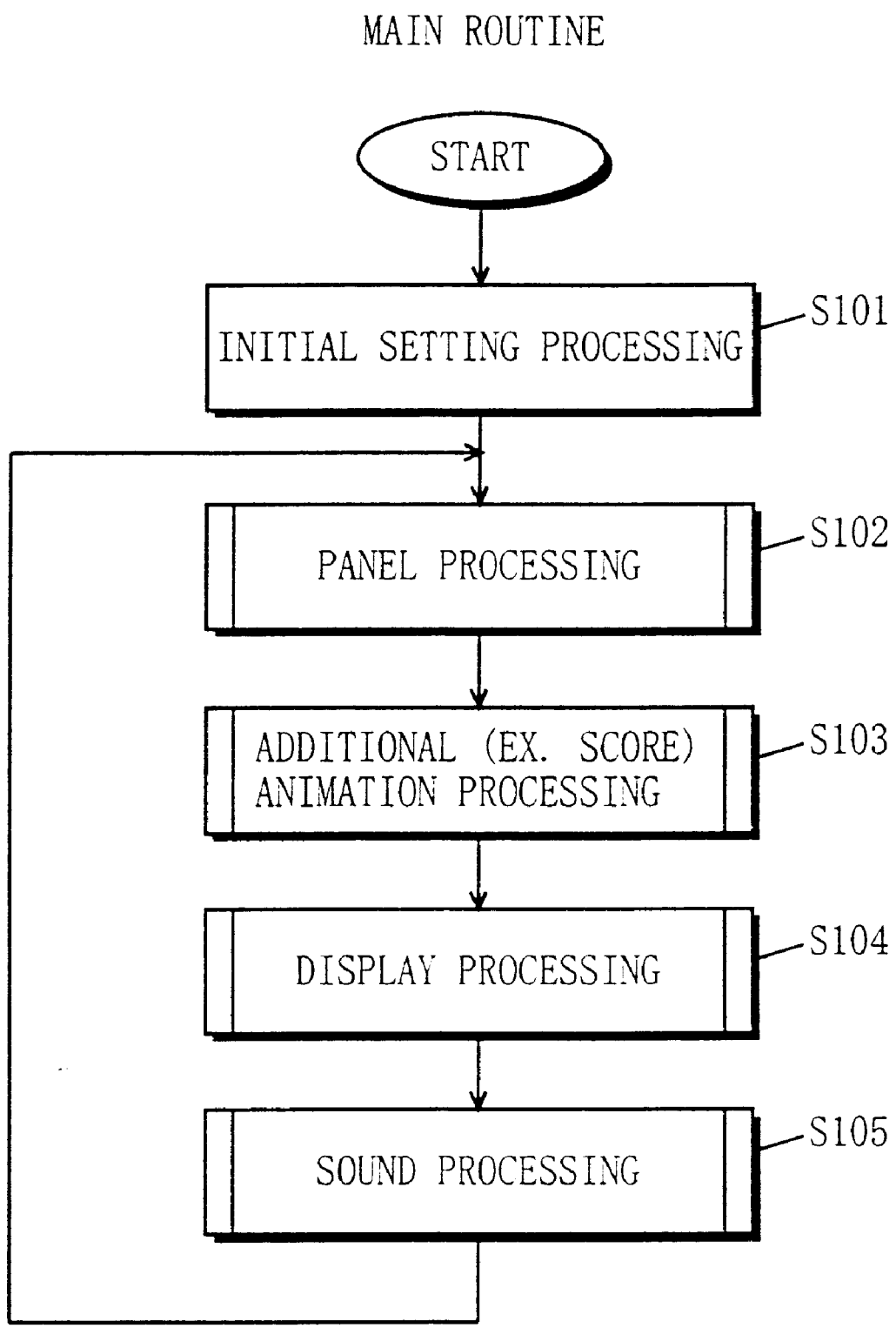
FIG. 7 is a flowchart of the main routine.
Figure 8:
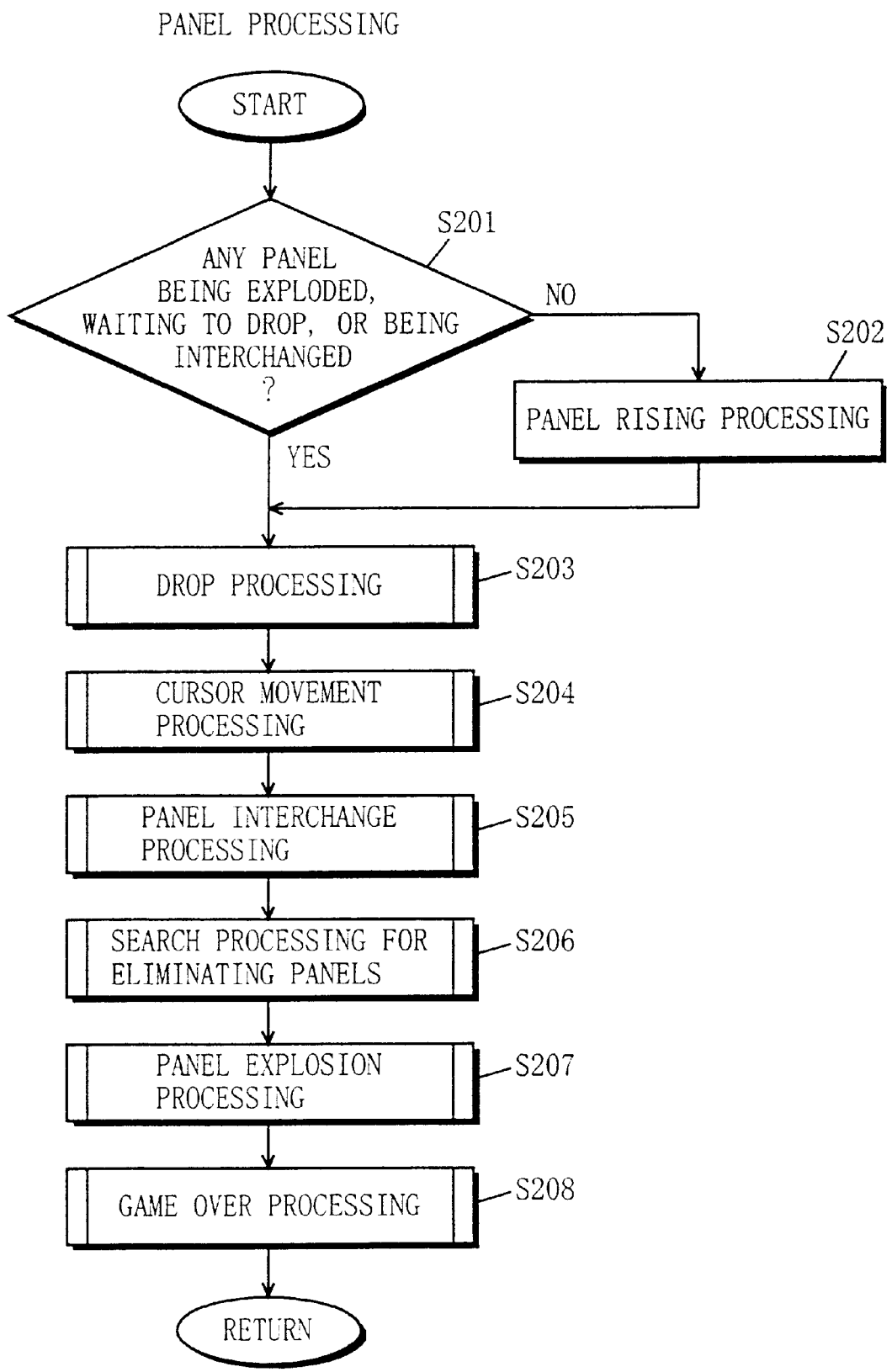
FIG. 8 is a flowchart of the panel processing.

FIG. 8 is a detailed flowchart showing the operation in the panel processing (step S102) shown in FIG. 7. Hereinafter, by referring to FIG. 8, the panel processing is described in detail. The CPU 11 first determines whether or not any currently-displayed panel is being exploded, waiting to drop, or being interchanged (step S201). This determination is made by referring to the status value E2 (see FIG. 6) for every entry of the 2D field table 80 in FIG. 5. If no panel is being exploded, waiting to drop, or being interchanged, the CPU 11 effects the panel rising processing (step S202). In detail, the CPU 11 has new panels for a whole line (or a fixed number of panels less than for a line; e.g., 8 panels in line visible at the front) risen from the bottom of the 3D game field 70. Thereafter, the operation of CPU 11 goes to step S203. If any panel is in the status of explosion/drop wait/being interchanged, the CPU 11 does not effect the panel rising processing but the drop processing in step S203, which has a higher priority.

Figure 9:
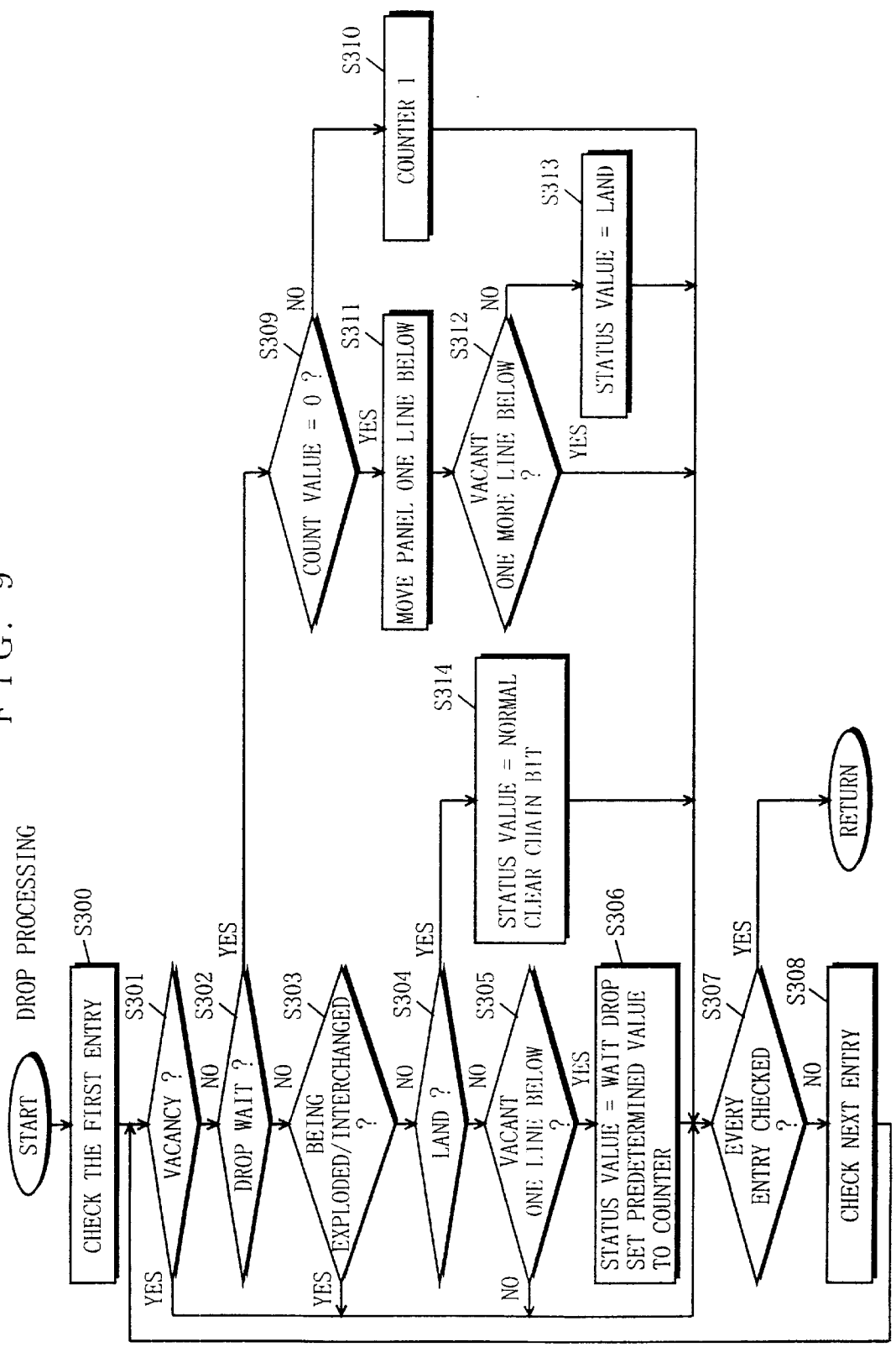
FIG. 9 is a flowchart of the drop processing.

The details of the subroutine step S203 are shown in FIG. 9. Hereinafter, by referring to FIG. 9, the drop processing is described in detail. Herein, the drop processing is, in a case where panels were eliminated as being in line over a fixed number (e.g., four) in the preceding step, processing executed to drop any suspended panel located above the eliminated panels. The CPU 11 first checks the status value E2 of the first entry of the 2D field table 80 in FIG. 5 to check in which status the first panel is (step S300). Although the first entry can be arbitrarily determined, an entry having an address of (0, 0) is regarded as the first entry in this example. Thereafter, the CPU 11 determines whether or not the checked status value E2 indicates vacancy (step S301). Herein, vacancy means such status that the corresponding display region of the 3D game field 70 has no panel displayed (see-through).

When the status value E2 of the currently-targeted entry indicates vacancy, the operation of the CPU 11 goes to step S307. When the status value E2 of the currently-targeted entry does not indicate vacancy, on the other hand, the CPU 11 determines whether or not the checked status value E2 indicates drop wait, being exploded/interchanged, or land (steps S302 to S304). When the status value E2 does not indicate drop wait, explosion/being interchanged, or land, the CPU 11 checks another entry located one line below to the currently-targeted entry, and then determines whether or not the status value E2 thereof indicates vacancy (step S305). If the status value E2 of the entry one line below does not indicate vacancy, the CPU 11 then determines whether or not every entry of the 2D field table 80 has been checked (step S307). If not every entry is checked yet, the CPU 11 checks the status value E2 of the next entry (step S308), and the operation thereof returns to step S301.

Described below is an operation when the status value E2 of the entry one line below to the currently-targeted entry indicates vacancy. In this case, the panel displayed on the display region of the 3D game field 70 corresponding to the currently-targeted entry is suspended, and thus the panel is required to drop. Therefore, the CPU 11 sets a bit value indicating drop wait to the status value E2 of the currently-targeted entry, and also sets a predetermined value to the counter E3 thereof (step S306). Thereafter, the operation of the CPU 11 goes to step S307.

Described below is an operation when the status value E2 of the currently-targeted entry indicates drop wait. In this case, the CPU 11 determines whether or not the count value of the counter E3 of the entry is 0 (step S309). Note that, the predetermined value has been set to the counter E3 in step S306, and the initial value thereof is one or more. When the count value of the counter E3 is not 0, the CPU 11 decrements the counter value of the counter E3 by 1 (step S310). Accordingly, when the predetermined value set to the counter E3 is exemplarily "3", it is known that the count value of the counter E3 becomes 0 three frames after, and the count value thereof is determined as being 0 four frames after. After determining that the count value of the counter E3 becomes 0, the CPU 11 moves the corresponding panel one line below (step S311). To be more specific, the CPU 11 copies the status value E2, the panel pattern E4, and the chain bit E5 of the currently-targeted entry (in this paragraph, referred to as target entry) so as to overwrite the entry one line below (in this paragraph, referred to as lower entry) therewith, and also sets a bit value indicating vacancy to the status value E2 of the target entry and clears the panel pattern E4 and the chain bit E5 thereof. Thereafter, the CPU 11 determines whether or not the status value E2 of the entry one line below to the lower entry (in this paragraph, referred to as still-lower entry) indicates vacancy (step S312). If the status value E2 of the still-lower entry indicates vacancy, the operation of the CPU 11 goes to step S307 to continue the drop processing. If the status value E2 of the still-lower entry does not indicate vacancy, on the other hand, the CPU 11 sets a bit value indicating land to the status value E2 of the lower entry (step S313). Thereafter, the operation of the CPU 11 goes to step S307.

Described next is an operation when the status value E2 of the currently-targeted entry indicates land. In this case, the CPU 11 sets a bit value indicating normal to the status value E2 of the entry and clears the chain bit E5 thereof (step S314). Thereafter, the operation of the CPU 11 goes to step S307.

Note that, when the status value E2 of the currently-targeted entry indicates explosion or being interchanged, the CPU 11 does not effect any processing but goes to step S307 so as not to drop the panel corresponding to the entry before the panel is subjected to the explosion processing or interchange processing. After determining that every entry has been checked in step S307, the CPU 11 terminates the drop processing and then returns to the panel processing in FIG. 8.

Figure 10:
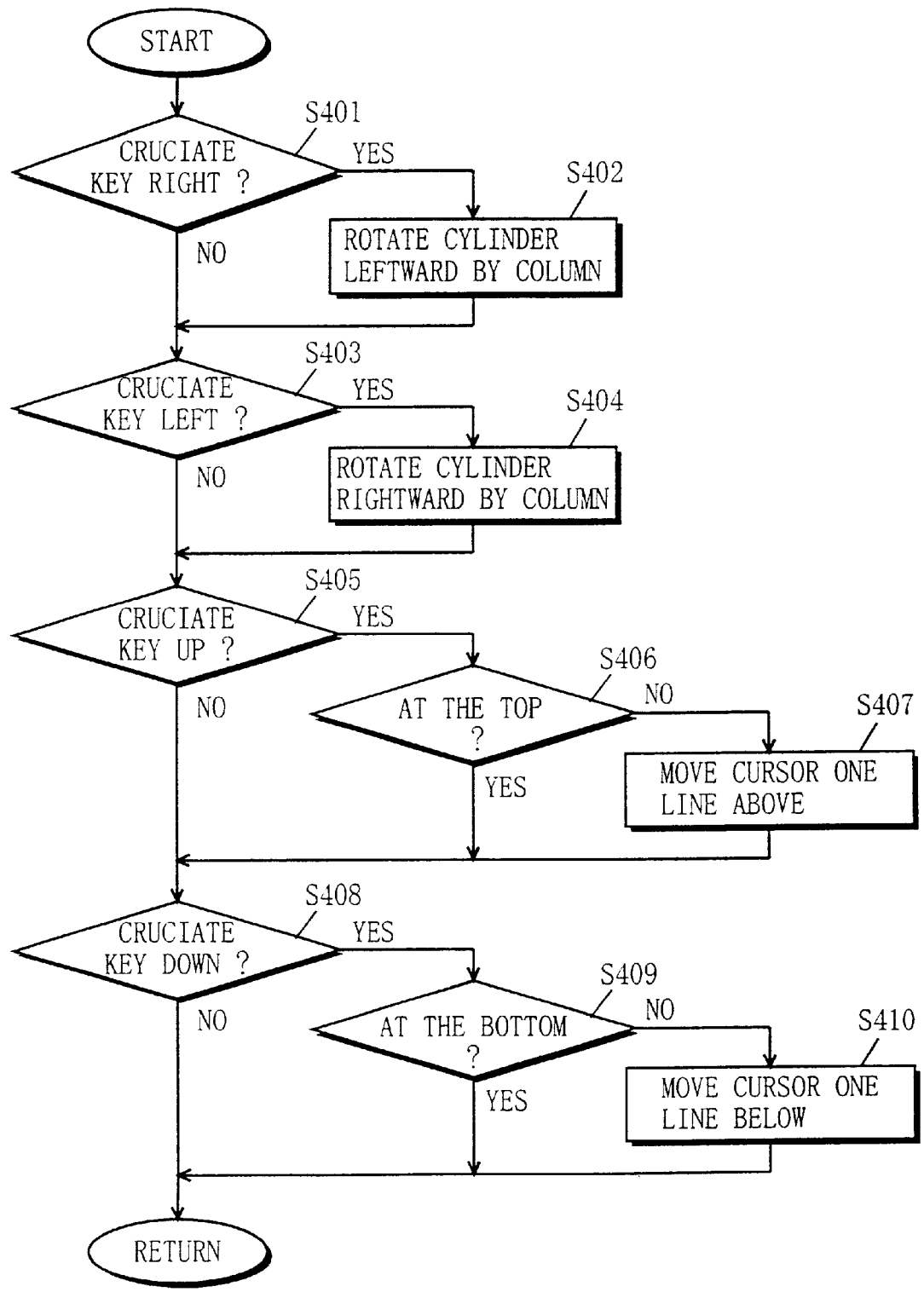
FIG. 10 is a flowchart of the cursor movement processing.

By referring back to FIG. 8, the CPU 11 now effects the cursor movement processing (step S204). Herein, the cursor movement processing is processing executed to change the relative positional relationship between the cursor 71 and the 3D game field 70 by responding to the actuation of a cruciate key (directional switch) 41 (see FIG. 1) provided on the controller 40. The details of the subroutine step S204 are shown in FIG. 10. By referring to FIG. 10, the cursor movement processing is described next below. The CPU 11 first determines whether or not a right-direction switch of the cruciate key 41 is pressed (step S401). When the right-direction switch is pressed, the CPU 11 leftwardly rotates the 3D game field 70 by a column (step S402). In this manner, the cursor stays on the same position on the screen but is regarded as being rightwardly moved by a column relative to the 3D game field 70. Herein, to leftwardly rotate the 3D game field 70 by a column, the contents of the entries of the 2D field table 80 in FIG. 5 are moved to each adjoining entry on the left. Note that the contents of the entries in the 0-th column are moved to the F-th column. Next, the CPU 11 determines whether or not a left-direction switch of the cruciate key 41 provided on the controller 40 is pressed (step S403). When the left-direction switch is pressed, the CPU 11 rightwardly rotates the 3D game field 70 by a column (step S404). In this manner, the cursor stays on the same position on the screen but is regarded as being leftwardly moved by a column relative to the 3D game field 70. Herein, to rightwardly rotate the 3D game field 70 by a column, the entry data is subjected to the update processing so as to move the contents of the entries of the 2D field table 80 in FIG. 5 to each adjoining entry on the right. Note that the contents of the entries in the F-th column are moved to the 0-th column, which is a head column after rotated once. In this manner, by responding to the actuation of the directional switch 41, the processing to change the display status of the 3D game field 70 is executed.

Although the entry data of the 2D field table 80 is rightwardly or leftwardly moved to rotate the 3D game field 70 rightwardly or leftwardly in this embodiment, as an alternative thereto, the correspondence between the entry addresses of the 2D field table 80 and the display region addresses of the 3D game field 70 may be rightwardly or leftwardly shifted. In this manner, results are to be similar to this embodiment. To shift the correspondence between the entry addresses and the display region addresses, a starting position to read data from the 2D field table 80 may be rightwardly or leftwardly shifted.

Thereafter, the CPU 11 determines whether or not an upward-direction switch of the cruciate key 41 provided on the controller 40 is pressed (step S405). If the upward-direction switch is pressed, the CPU 11 determines whether or not the cursor is located at the top (the 0-th line) of the 3D game field 70 (step S406). When the cursor is not located at the top of the 3D game field 70, the CPU 11 moves the cursor 71 one line above (step S407). When the cursor is located at the top of the 3D game field 70, the cursor 71 cannot be moved further upward. Therefore, the operation of the CPU 11 goes to step S408 without a change of the cursor position. Then, the CPU 11 determines whether or not a downward-direction switch of the cruciate key 41 provided on the controller 40 is pressed (step S408). If the downward-direction switch is pressed, the CPU 11 determines whether or not the cursor is located at the bottom (the b-th line) of the 3D game field 70 (step S409). When the cursor is located above the bottom of the 3D game field 70, the CPU 11 moves the cursor 71 one line below (step S410). When the cursor is located at the bottom of the 3D game field 70, on the other hand, the cursor 71 cannot be moved further downward and thus the CPU 11 terminates the cursor movement processing in FIG. 10 without a change of the cursor position, and the operation thereof returns to the panel processing routine in FIG. 8.

Figure 11:
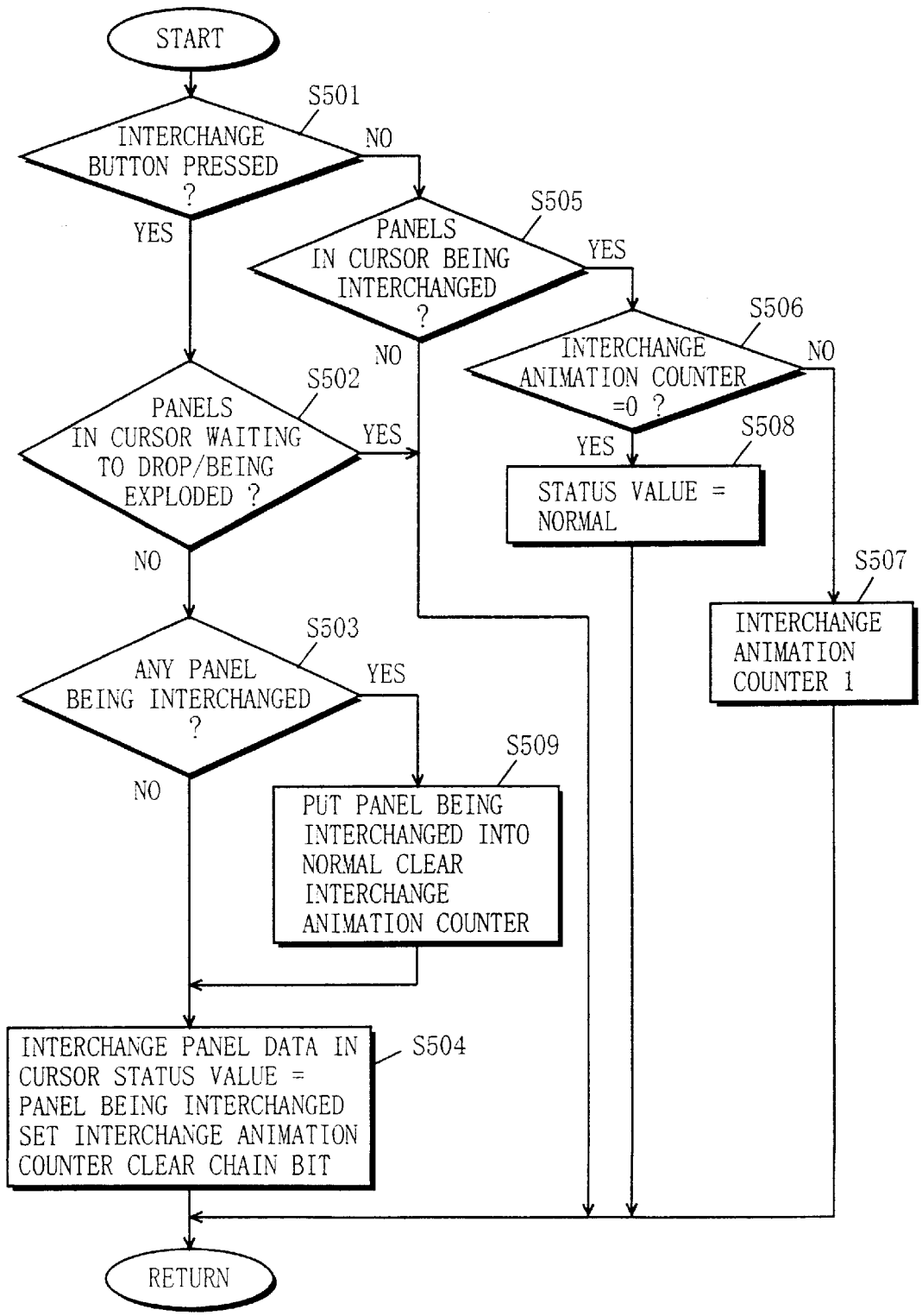
FIG. 11 is a flowchart of the panel interchange processing.

By referring back to FIG. 8, the CPU 11 now effects the panel interchange processing (step S205). Herein, the panel interchange processing is processing executed to interchange the display positions of two panels displayed in the cursor 71. The details of the subroutine step S1205 are shown in FIG. 11. By referring to FIG. 11, the panel interchange processing is described next below. The CPU 11 first determines whether or not an interchange button (any one button provided on the controller 40 is assigned as the interchange button) is pressed (step S501). When it is determined that the interchange button is pressed, the CPU 11 then determines whether or not the panels in the cursor 71 are in the state of drop wait or explosion (step S502). When the panels in the cursor 71 are in the state of drop wait or explosion, the CPU 11 terminates the panel interchange processing in FIG. 11 without interchanging the panels in the cursor 71 even if the interchange button is pressed. This is to give a higher priority to the drop processing or explosion processing. When the panels in the cursor 71 are not in the status of drop wait or explosion, on the other hand, the CPU 11 determines whether or not the panels therein are being interchanged (step S503). This determination is made by referring to the status value E2 of the entries of the 2D field table corresponding to the cursor 71. If there is no panel being interchanged, the operation of the CPU 11 goes to step S504.

In step S504, the CPU 11 interchanges panel data of the two panels in the cursor 71, sets a bit value indicating the panel being interchanged to the status value E2 of the corresponding entries, sets a predetermined value to an interchange animation counter, and clears the chain E5 of the corresponding entries. Herein, interchanging panel data means that predetermined data (status value E2, panel pattern E4, chain bit E5) is exchanged between two entries of the 2D field table 80 corresponding to the two panels in the cursor 71. The interchange animation counter is not shown but is provided in a predetermined region in the RAM 15, for example. By setting the bit value indicating the panel being interchanged to the status value E2, the interchange animation processing routine (not shown) is started.

Figure 17:
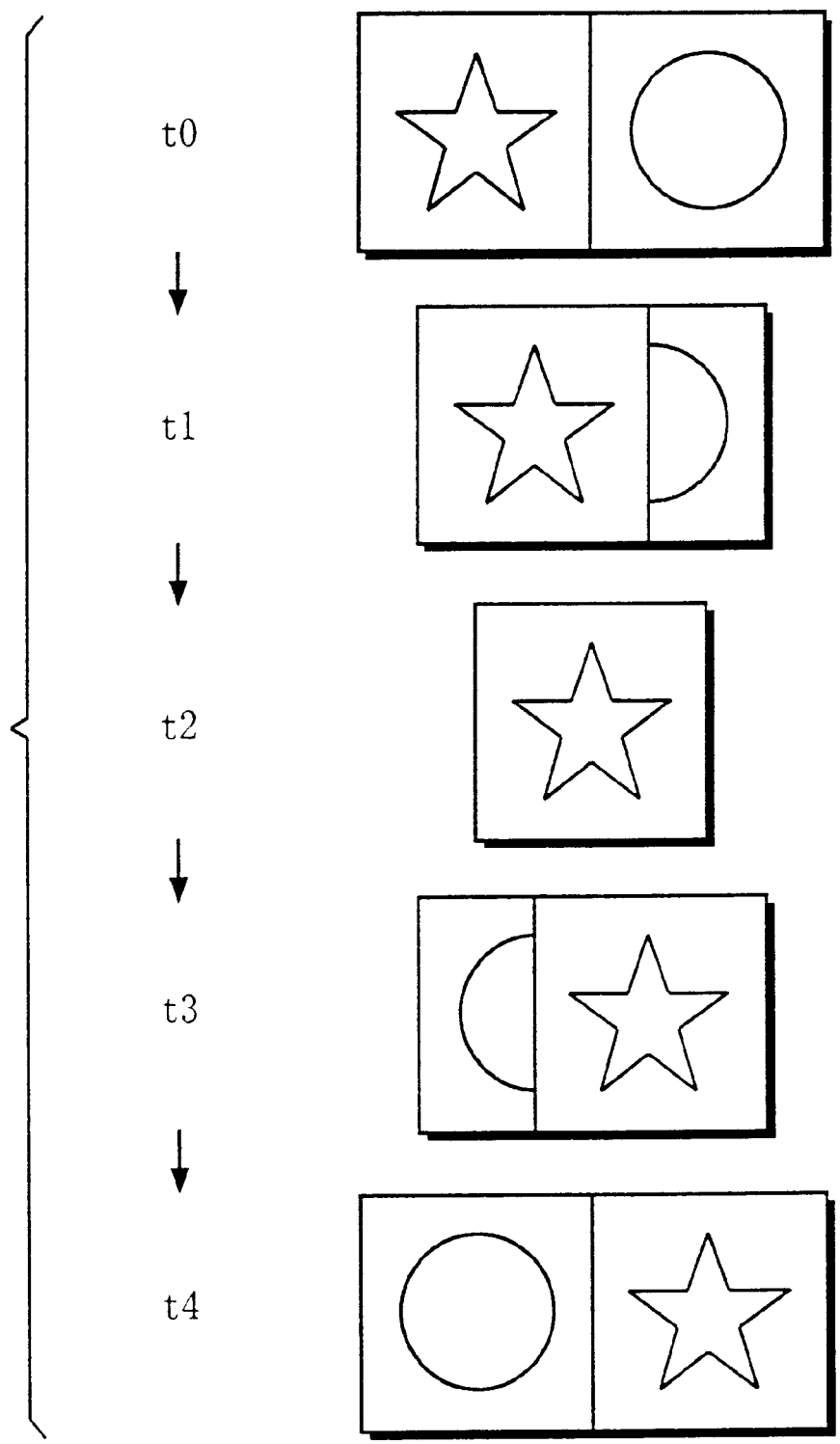
FIG. 17 is a diagram exemplarily illustrating the display state change of panels through the interchange animation processing routine.

FIG. 17 illustrates an example of the display state change of panels through the interchange animation processing routine. In FIG. 17, a timing t0 shows panels before interchange, timings t1 to t3 show panels in progress, and a timing t4 shows panels after interchange. That is, in the interchange animation processing routine, four timings of t1 to t4 are provided to display the panels being interchanged. Accordingly, in this embodiment, a predetermined value set to the interchange animation counter is 4. By showing the player the process of panel interchange in several steps, the player perceives the interchange occurring not instantaneously but gradually. As is described later, the display regions of the 3D game field 70 are structured by polygons, and the panel display data selected from the parts table in FIG. 16 is provided thereto as texture for display of the panels. Herein, the display regions in the cursor 71 are, exceptional, and are not treated as polygons but as a bit map display area. This is the reason why, in the cursor 71, the panels can be displayed in a superimposing manner as shown with the timings t1 to t3. After step S504, the operation of the CPU 11 returns to the panel processing in FIG. 8.

Next, an operation when the interchange button is determined not to be pressed in step S501 is described below. In this case, the CPU 11 determines whether or not the panels in the cursor 71 are being interchanged (step S505). This determination is made by referring to the status value E2 of the entries of the 2D field table 80 corresponding to the cursor 71. If the panels in the cursor 71 are not being interchanged, the operation of the CPU 11 returns to the panel processing in FIG. 8. When the panels in the cursor 71 are being interchanged, on the other hand, the CPU 11 determines whether or not the count value of the interchange animation counter is 0 (step S506). If the count value of the interchange animation counter is not 0, the CPU 11 decrements the count value of the interchange animation counter by 1 (step S507). Thereafter, the operation of the CPU 11 returns to the panel processing in FIG. 8. As is described in the foregoing, the predetermined value set to the interchange animation counter is 4, and the counter value thereof will be 0 four frames after with the current frame included. At this time, the panels in the cursor 71 are displayed as shown in FIG. 17 with the timing t4. In the 5$^{th}$ frame following thereto, the CPU 11 determines the count value of the interchange animation counter as being 0, and then sets the bit value indicating normal to the status value E2 of the corresponding entries (step S508). This is the end of the panel interchange processing. Thereafter, the operation of the CPU 11 returns to the panel processing in FIG. 8.

Figure 18:
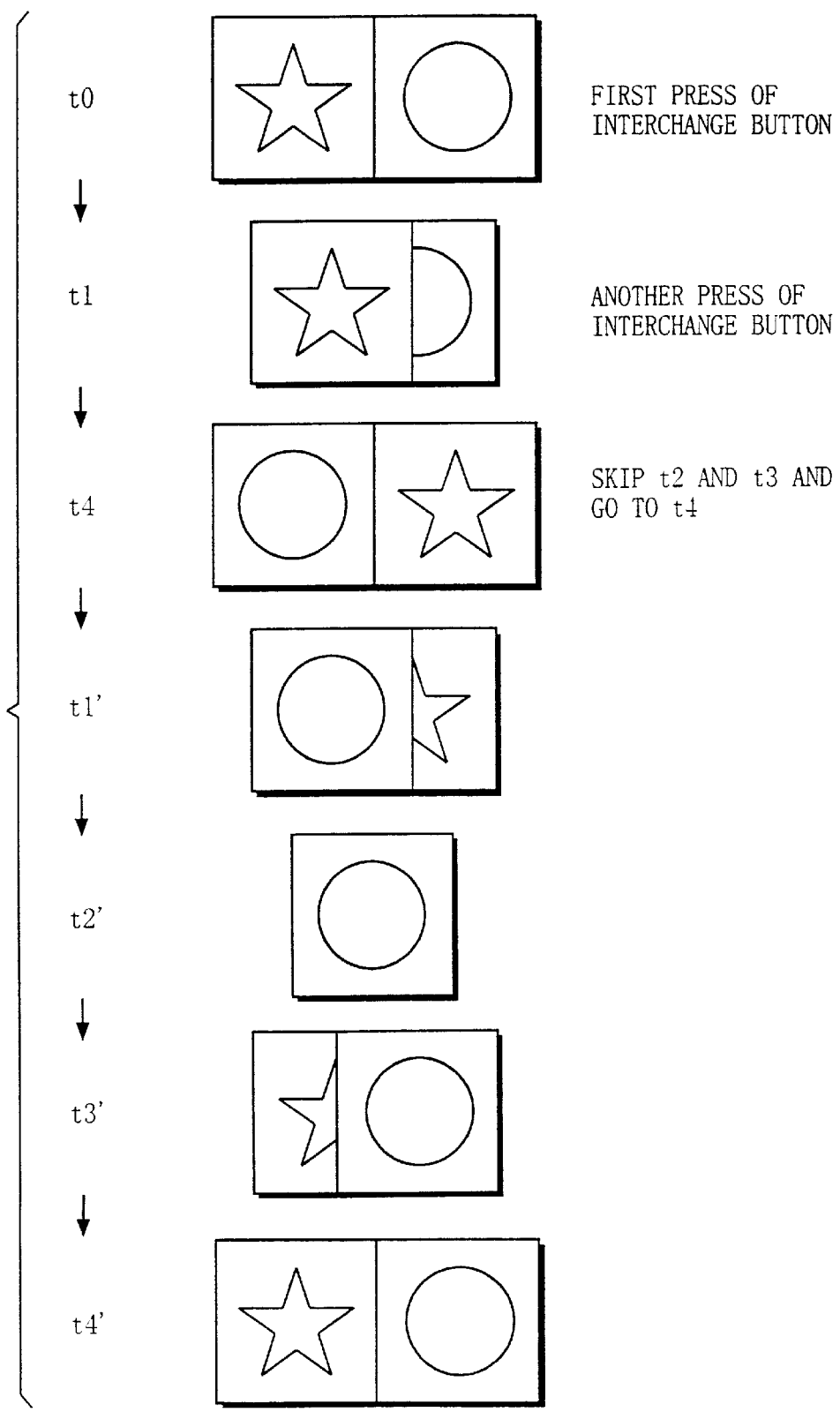
FIG. 18 is a diagram illustrating the display state change of the panels when the interchange button is successively pressed.

Next, an operation when the interchange button is successively pressed, that is, when the interchange button is pressed for the second time before the panel interchange processing responding to the press for the first time is completed is described. In this case, the CPU 11 determines that there are panels being interchanged in step S503, and the operation thereof goes to stop S509. In step S509, the CPU 11 sets normal to the status value E2 of the panels being interchanged, and clears the interchange animation counter. The interchange animation processing routine currently in progress is forcibly terminated thereby. Thereafter, the operation of the CPU 11 goes to step S504. The interchange animation processing routine is started again thereby. FIG. 18 shows an example of the display state change of the panels when the interchange button is successively pressed.

As shown in FIG. 18, when the button is given the first press with the timing t0 and the second press with the timing t1, the panels are not displayed with timings t2 and t3 but are with the timing t4. The interchange animation processing routine responding to the first press is forcibly terminated thereby. Thereafter, the interchange animation processing routine responding to the second press is started. The panel display in the interchange animation processing routine responding to the second press is made with timings t1' to t4'. The panel display made with the timings t1' to t4' is similar to the panel display made with the timings t1' to t4' in FIG. 17. In a case in which the interchange button is successively pressed, the interchange animation processing routine responding to the first press is forcibly terminated, whereby the second press can be swiftly responded to display.

Figure 12:
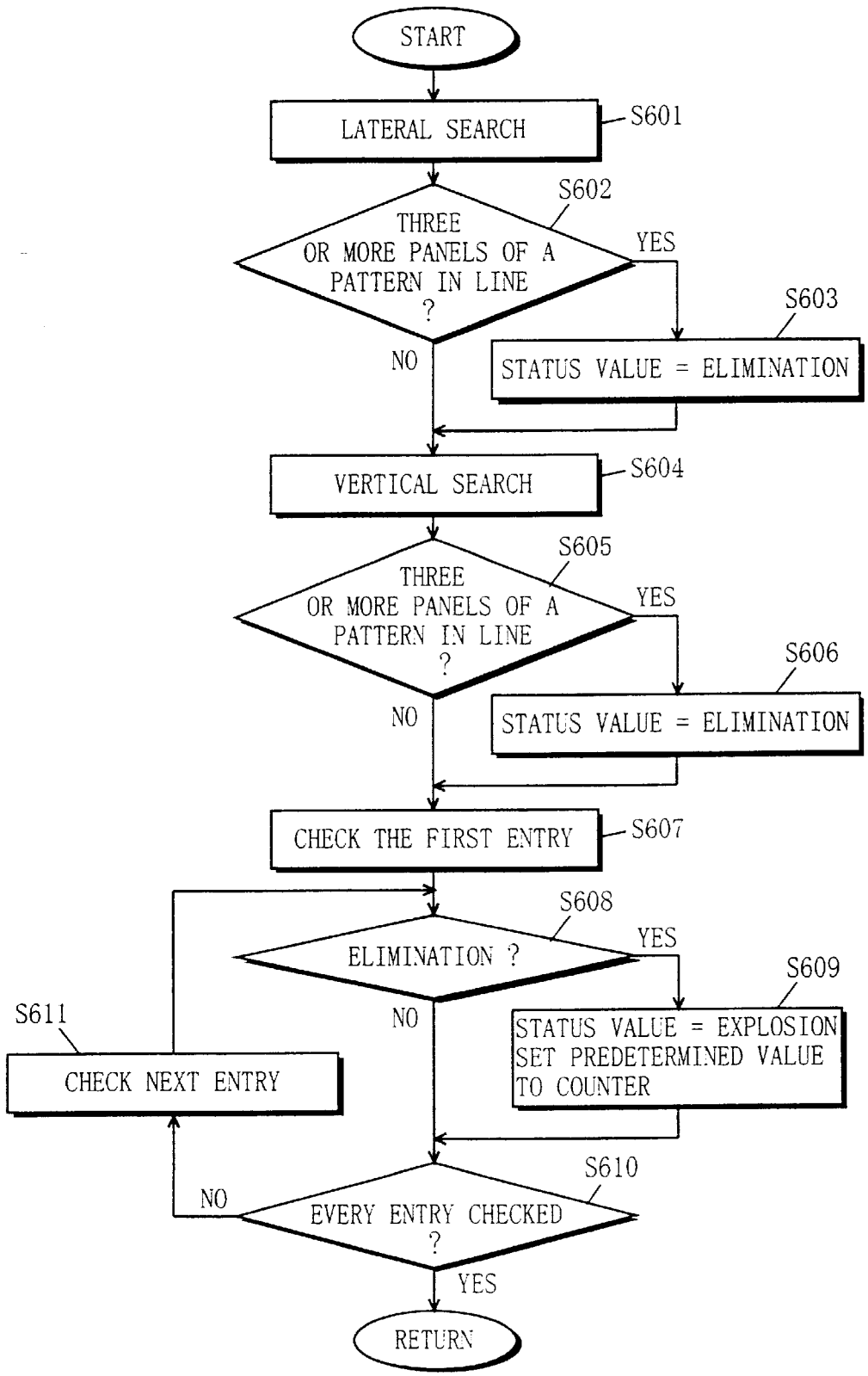
FIG. 12 is a flowchart of the search processing for eliminating panels.

Referring back to FIG. 8, the CPU 11 now effects the search processing for eliminating panels (step S206). Herein, the search processing for eliminating panels is processing executed to search for panels satisfying an elimination condition. The details of the subroutine step S206 are shown in FIG. 12. Hereinafter, by referring to FIG. 12, the search processing for eliminating panels is described. The CPU 11 first performs a lateral search of the 2D field table 80 in FIG. 5 (step S601), and then determines whether or not three or more panels of a pattern (mark) are laterally in line (step S602). If three or more panels of a pattern are laterally in line, the CPU 11 sets a bit value indicating elimination to the status value E2 of the corresponding entries of the 2D field table 80 (step S603). Thereafter, the CPU 11 performs a vertical search of the 2D field table 80 (step S604), and then determines whether or not three or more panels of a pattern are vertically in line (step S605). If three or more panels of a pattern are vertically in line, the CPU 11 sets the bit value indicating elimination to the status value E2 of the corresponding entries of the 2D field table 80 (step S606).

After the lateral and vertical searches, the CPU 11 checks the status value E2 of the first entry of the 2D field table 80 (step S607). Herein, although the first entry can be arbitrarily determined as in step S300, an entry having an address of (0, 0) is regarded as the first entry in this example. The CPU 11 then determines whether or not the checked status value E2 indicates elimination (step S608). When the checked status value E2 indicates elimination, the CPU 11 sets a bit value indicating explosion to the status value E2, and also sets a predetermined value to the corresponding counter E3 (step S609). When the checked status value E2 does not indicate elimination, on the other hand, the CPU 11 does not change the status value E2. Then, the CPU 11 determines whether or not every entry has been checked (step S610), if not yet, checks the next entry (step S611), and the operation thereof returns to step S608. Thereafter, steps S608 to S611 are repeated to check every entry, and then the operation of the CPU 11 returns to the panel processing in FIG. 8.

Note that, the panels to be searched in steps S601 or S604 are limited to the ones whose each status value E2 indicates normal, land, or elimination. It means that the panels being interchanged, being exploded, or waiting to drop are not searched. Herein, the panels whose status value E2 being set elimination in the lateral search are also subjected to the vertical search. Therefore, when three or more panels laterally line and three or more panels vertically in line cross each other, elimination is set to all those panels.

Figure 13:
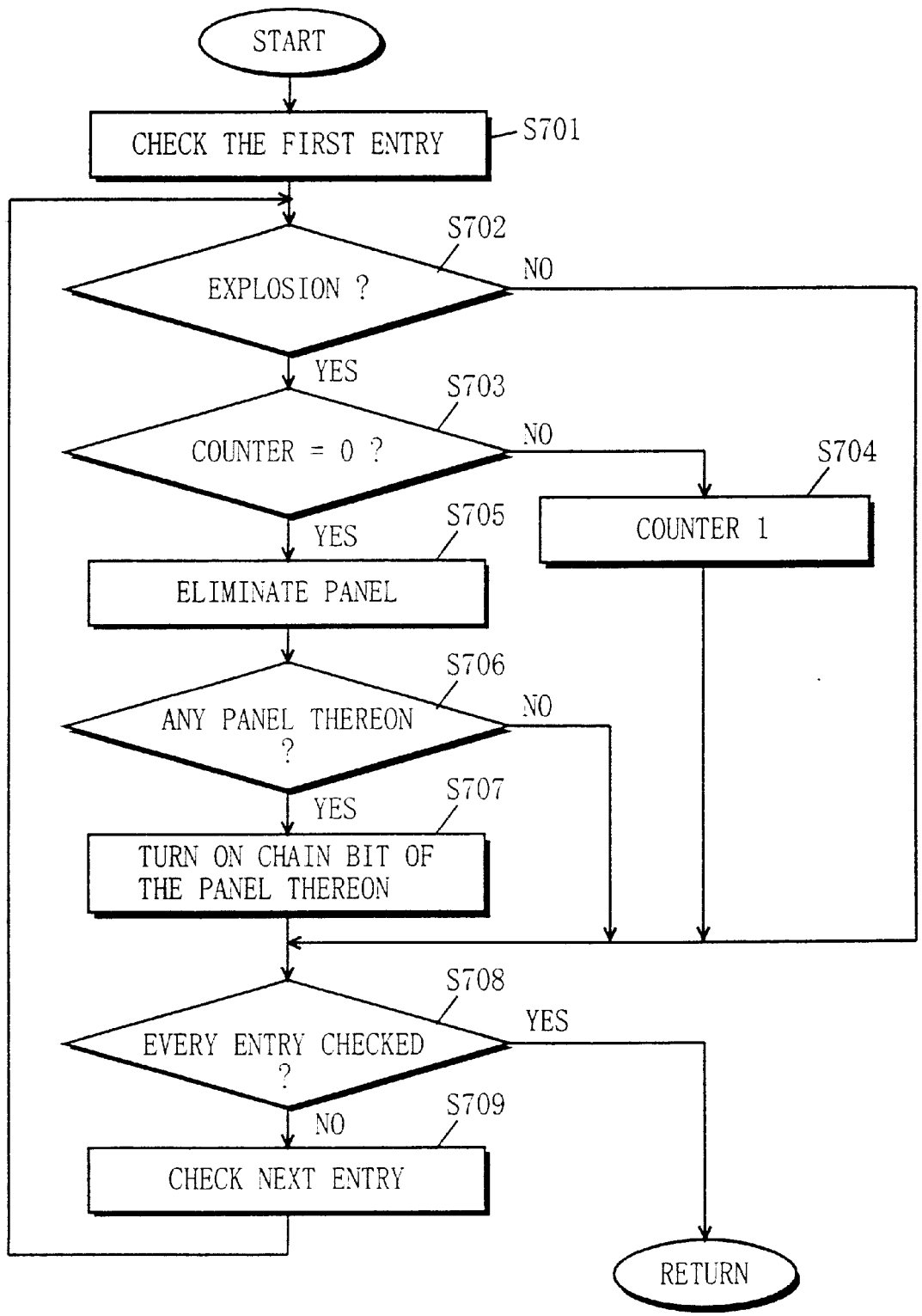
FIG. 13 is a flowchart of the panel explosion processing.

Referring back to FIG. 8, the CPU 11 now effects the panel explosion processing (step S207). Herein, the panel explosion processing is processing executed to eliminate panels satisfying the elimination condition. The details of the subroutine step S207 are shown in FIG. 13. Hereinafter, by referring to FIG. 13, the panel explosion processing is described. The CPU 11 first checks the status value E2 of the first entry (step S701). Herein, the first entry can be arbitrarily determined as in step S300, an entry having an address of (0, 0) is regarded as the first entry in this example. The CPU 11 then determines whether or not the checked status value E2 indicates explosion (step S702). When the checked status value E2 indicates explosion, the CPU 11 determines whether or not the count value of the counter E3 of the corresponding entry is 0 (step S703). The predetermined value of the counter E3 has been set in step S609 (FIG. 12). When the count value of the counter E3 is not 0, the CPU 11 decrements the count value of the counter E3 by 1 (step S704). Accordingly, with the predetermined value set, the count value of the counter E3 becomes 0 after the number of frames equal to the value. After step S704, the operation of the CPU 11 goes to step S708. When the count value of the counter E3 is 0, on the other hand, the CPU 11 sets the bit value indicating vacancy to the status value E2 of the same entry (step S705). In this manner, the panel having a count value 0 is eliminated from the display region of the 3D game field 70.

Next, the CPU 11 determines whether or not another panel is located above the eliminated panel, that is, whether or not the eliminated panel carries another panel thereon in the same column (step S706). When another panel is located above the eliminated panel, the CPU 11 sets ON every chain bit E5 of the entries corresponding to the panels piled on the eliminated panel (step S707). Then, the operation of the CPU 11 goes to step S708. When the eliminated panel does not carry another panel thereon, the operation of the CPU 11 goes to step S708 without setting ON the chain bit E5.

The reason for setting ON the chain bits with respect to the panels piled on the eliminated panel is as follows. That is, since setting ON the chain bit leads to elimination of a panel located next below, and results in panel drop through the drop processing in FIG. 9. As the panels are rearranged due to the panel drop and land, the search processing for eliminating panels in FIG. 12 is executed again to determine whether or not any panel satisfies the elimination condition. If satisfied, the panel is eliminated through the explosion processing in FIG. 13. To be more specific, in this case, a certain panel's elimination resulted from the panel interchange in the cursor 71 brings about successive elimination of other relevant panels. The chain bit E5 is provided for distinguishing whether the panel elimination is effectuated by the panel interchange or chaining. If the panel elimination is effectuated by chaining, the game is structured to score higher than the panel elimination effectuated by the panel interchange. Further, it is expected in this embodiment that such panel elimination effectuated by chaining may possibly occur in a row. If this is the case, the more often the panel elimination effectuated by chaining occurs, the more points are scored.

Thereafter, the CPU 11 determines whether or not every entry of the 2D field table 80 has been checked (step S708), if not yet, checks the next entry (step S709), and the operation of the CPU 11 returns to step S702 to check every entry. Thereafter, the CPU 11 terminates the panel explosion processing, and the operation thereof returns to the panel processing in FIG. 8.

Figure 14:
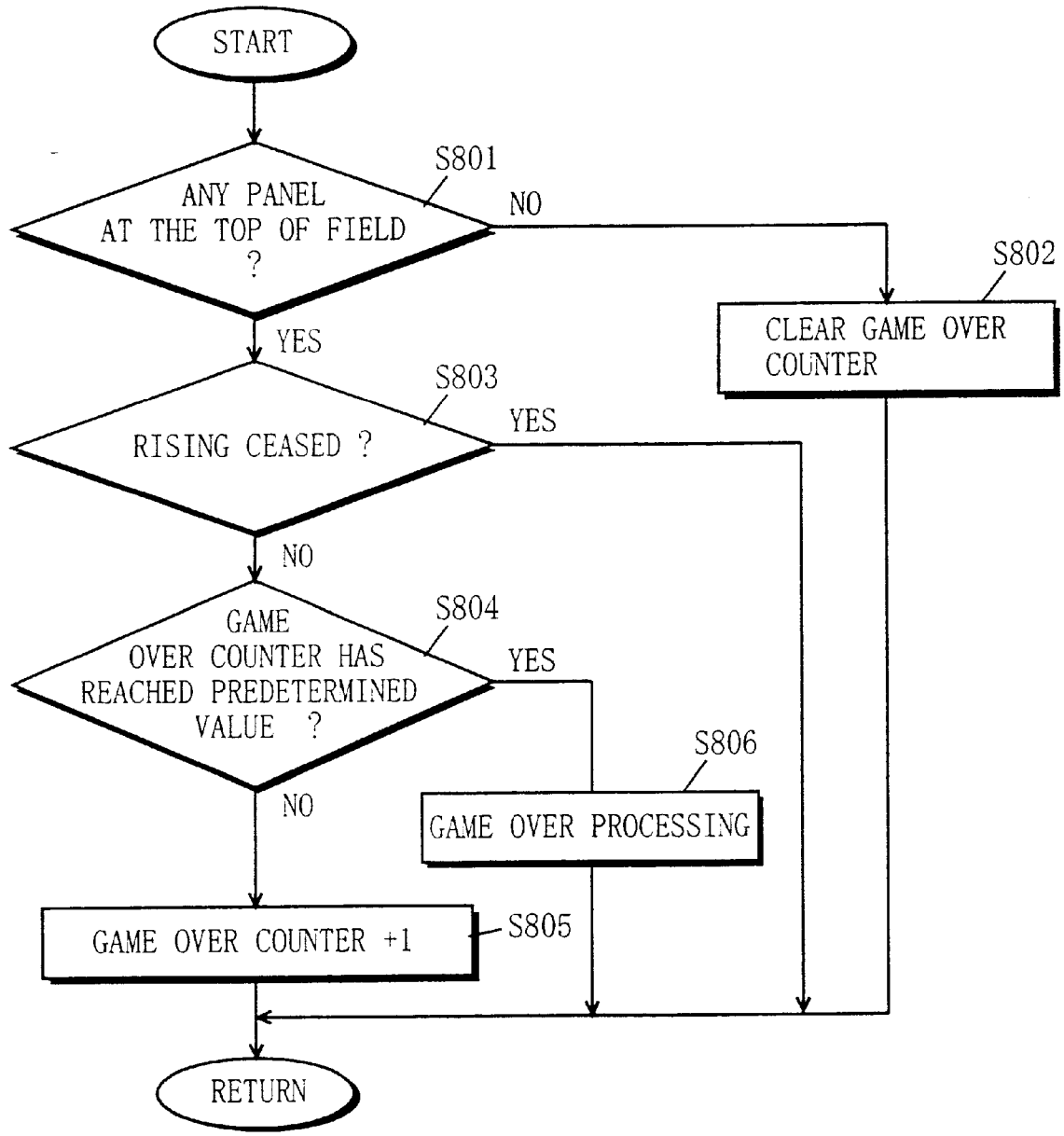
FIG. 14 is a flowchart of the game over processing.

Referring back to FIG. 8, the CPU 11 now effects the game over processing (step S208). The details of the subroutine step S208 are shown in FIG. 14. Hereinafter, by referring to FIG. 14, the game over processing is described.

The CPU 11 first determines whether or not any panel is located at the top of the 3D game field laterally extended around the 3D game field 70 (step S801). When no panel is observed at the top of the 3D game field, the CPU 11 clears a game over counter (is not shown but provided in the RAM 15, for example) (step S802), and the operation thereof returns to the panel processing in FIG. 8. When any panel is observed at the top of the 3D game field, the CPU 11 determines whether or not the new panel rising processing has been ceased (step S803). As described in the foregoing, the new panel rising processing is ceased when there is any panel being exploded, waiting to drop, or being interchanged (steps S201 and S202 in FIG. 8). When the panel rising processing ceases, the operation of the CPU 11 returns to the panel processing in FIG. 8 without determining whether or not the game is over. When the panel rising processing is not ceased, on the other hand, the CPU 11 determines whether or not a count value of the game over counter has reached a predetermined value (step S804), if not, increments the count value of the game over counter by 1 (step S805), if yes, effects the game over processing (step S806). As is known from the above, in this embodiment, the game is not terminated when some panel reaches the top of the 3D game field but when the count value of the game over counter reaches the predetermined value. Thereafter, the operation of the CPU 11 returns to the panel processing in FIG. 8.

Figure 15:
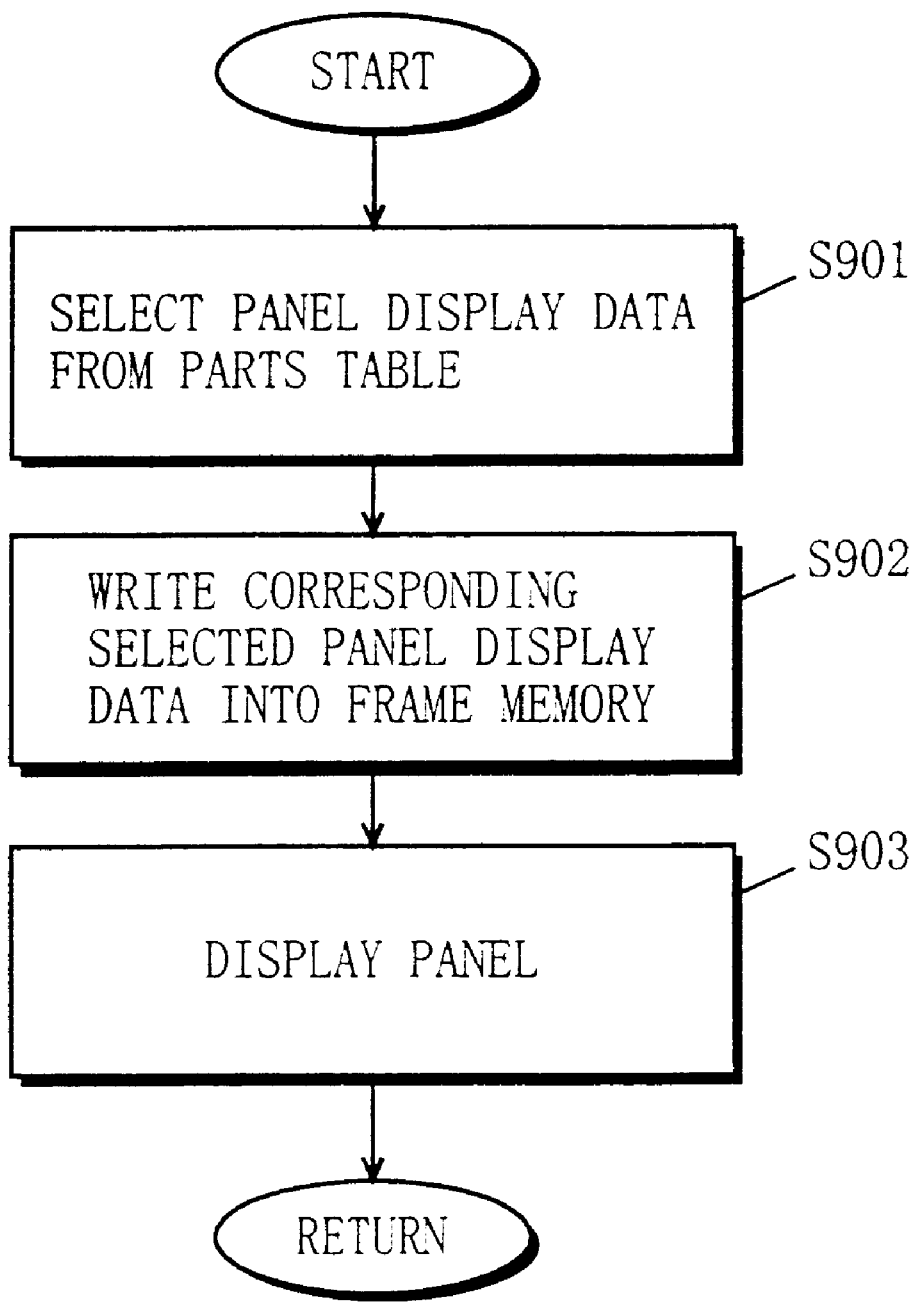
FIG. 15 is a flowchart of the display processing.

By referring back to FIG. 8, after the game over processing in step S208, the CPU 11 terminates the panel processing in FIG. 8 and returns to the main routine in FIG. 7. Then, the CPU 11 now effects the display processing (step S104). The details of the subroutine step S104 are shown in FIG. 15. Hereinafter, by referring to FIG. 15, the display processing is described. The CPU 11 first selects, from the parts table in FIG. 16, the panel display data having a pattern corresponding to each panel pattern E4 stored in the entries of the 2D field table 80 (S901). In the parts table, as already described, a plurality of display data is registered for a pattern. This is because the panels are in visually different shapes depending on which column of the display region of the 3D game field 70 the panels are located. Accordingly, the CPU 11 determines on which column of the 3D game field 70 the panel is to be displayed by also referring to the addresses E1 stored in the entries, and according to the determination, selects the corresponding panel display data registered in the parts table for the pattern. Then, the CPU 11 places the panel display data selected in step S901, as texture, on the display regions (structured by polygons) of the 3D game field laterally extended around the 3D game field 70. The CPU 11 then converts the polygon data to which texture is provided into frame display data so as to write the data into frame memory (is not shown but provided in the RAM 15, for example) (step S902). Thereafter, the CPU 11 displays the panels on the display 31 in accordance with the frame display data written in the frame memory (step S903).

As described in the foregoing, in this embodiment, the panel display data is read from the previously-provided parts table, and is subjected to the prerendering processing in such a manner as to place the same on the 3D game field 70 as texture; therefore, high-speed rendering processing is possible. The real time rendering processing is of course possible, in which, as an alternative to the parts data, the panel shape for each column is calculated every time the RCP 12 performs rendering.

Note that, although the 3D game field applied in this embodiment is laterally extended around a cylindrical subject, other tubular subjects (e.g., polygonal tube, elliptical tube) may be possible for the 3D game field. Further, although the puzzle element in this embodiment is exemplarily a panel, the puzzle element is not limited to the panel but may be a capsule, a geometric block, or character. Still further, although the additional puzzle element is set to rise in this embodiment, the additional puzzle element may be set to drop. Still further, although the panels are set to be eliminated when those of a pattern being in line over a fixed number (e.g., three or more panels being in line) in this embodiment, any other different condition may be adopted to eliminated the panels.

Although the present invention can be applied to various types of puzzle games as is known from the above, some other types of puzzle games are specifically mentioned by way of example.

(1) First Game Example

In a first game example, a puzzle element is a plurality of panels varied in type on which oblique lines or angle lines are drawn. Additional panels are set to drop or rise. A player actuates a directional switch so as to change the positional relationship between the panels. In this manner, the lines drawn on the panels are connected and thus a broken line is formed. When a start point and an end point thereof meet after going around a 3D game field, it is detected that an elimination condition is satisfied, and thus the panels forming the line are eliminated.

(2) Second game Example

In a second game example, a puzzle element is elliptical capsules each dividable into halves. The parts of the capsule are colored with the same tint or different, and differed in type according to the color. Additional capsules are set to drop in a 3D game field, and a player actuates a directional switch so as to change the positional relationship between the capsules before landing. When the parts of capsules of a type displayed on the 3D game field with a 3D appearance are laterally or vertically in line over a fixed number, it is detected that an elimination condition is satisfied, and thus the parts of capsules being in line over the fixed number are eliminated.

(3) Third Game Example

In a third game example, a puzzle element is balls which are differed in type according to the color. Additional balls are set to drop in a 3D game field, and a player actuates a directional switch so as to change the positional relationship between the balls before landing. When the balls of a type are laterally or vertically in line over a fixed number, it is detected that an elimination condition is satisfied, and thus the balls being in line over the fixed number are eliminated.

(4) Fourth Game Example

In a fourth game example, a puzzle element is a plurality of blocks which are differed in type according to the shape. Each block is shaped by plurally combining a minimum unit of shape (e. g., square)(e.g., rod-shaped, convex, L-shaped, large square). Additional blocks are set to drop in a 3D game field, and a player actuates a directional switch so as to change the positional relationship between the blocks before landing. When a whole line of the 3D game field is occupied by the landed blocks, the elimination condition is satisfied and thus the blocks satisfying the condition are eliminated.

While the invention has been described in detail, the foregoing description is in all aspects illustrative and not restrictive. It is understood that numerous other modifications and variations can be devised without departing from the scope of the invention.

What is claimed is:

1. A three-dimensional (3D) puzzle game device in which a game proceeds as a player takes actions for puzzle elements varied in pattern displayed on a game field spreading across a display screen, the 3D puzzle game device comprising:
   a controller which is actuated by the player; and
   image processing means for effecting program processing for a 3D puzzle game in response to actuation of the controller, and then producing image data for the 3D puzzle game for display on a display, wherein
   said image processing means comprises:
      3D game field display control means for producing a 3D game field laterally extending around a tubular subject for display on said display;
      puzzle element display control means for displaying a plurality of puzzle elements varied in pattern on said 3D game field;
      location change means for changing, in response to the actuation of said controller, location of said puzzle elements displayed on said 3D game field;
      3D game field rotation means for rotating, in response to the actuation of said controller, said 3D game field along with the puzzle elements displayed thereon;
      elimination condition detection means for detecting that the location of the puzzle elements displayed on said 3D game field satisfies a given elimination condition; and
      elimination control means for performing a control in such a manner that the puzzle elements displayed on said 3D game field are eliminated when satisfying said elimination condition, wherein
         said location change means changes the location of puzzle elements frozen on said 3D game field.

2. The 3D puzzle game device as claimed in claim 1, wherein said puzzle element display control means further comprises puzzle element addition control means for displaying, on said display, after sequentially producing display data of additional puzzle elements to be displayed on said 3D game field, the additional puzzle elements along with the puzzle elements already on said 3D game field.

3. The 3D puzzle game device as claimed in claim 2, wherein said puzzle element addition control means displays the additional puzzle elements on said 3D game field in such a way that the additional puzzle elements gradually move in a predetermined direction.

4. The 3D puzzle game device as claimed in claim 3, wherein said location change means changes, in response to the actuation of said controller, the location of the puzzle elements on the move by said puzzle element addition control means.

5. The 3D puzzle game device as claimed in claim 1, wherein, on said 3D game field, when the puzzle elements of a pattern are in line in a predetermined direction over a fixed number, said elimination condition detection means detects that said given elimination condition is satisfied.

6. The 3D puzzle game device as claimed in claim 1, wherein, when puzzle elements having a predetermined relationship to one another are in line over a fixed number on said 3D game field, said elimination condition detection means detects that said given elimination condition is satisfied.

7. The 3D puzzle game device as claimed in claim 6, wherein said puzzle element display control means varies the patterns of the puzzle elements according to lines drawn thereon, and said elimination condition detection means detects that, when the lines drawn on the puzzle elements on said 3D game field are forming a line going around the 3D game field, said given elimination condition is satisfied.

8. The 3D puzzle game device as claimed in claim 1, wherein said puzzle element display control means varies the patterns of the puzzle elements by varying either color or design provided thereon.

9. The 3D puzzle game device as claimed in claim 1, wherein said puzzle element display control means varies the patterns of the puzzle elements by varying shapes thereof, which are structured by plurally combining a minimum unit of shape.

10. A three-dimensional (3D) puzzle game recording medium on which a program to be run by image processing means is recorded for realizing an operational environment on a 3D puzzle game device provided with a controller which is actuated by a player and the image processing means effects program processing for a 3D puzzle game in response to actuation of the controller and then produces image data for the 3D puzzle game for display on a display, when run by said image processing means, said program comprises:
   a 3D game field display control step of displaying a 3D game field laterally extending around a tubular subject on said display;
   a puzzle element display control step of displaying puzzle elements varied in pattern on said 3D game field;
   a location change step of changing, in response to the actuation of said controller, the location of said puzzle elements on said 3D game field;
   a 3D game field rotation step of rotating, in response to the actuation of said controller, said 3D game field along with the puzzle elements displayed thereon;
   an elimination condition detection step of detecting the location of the puzzle elements on said 3D game field satisfying a given elimination condition; and
   an elimination control step of performing a control in such a manner that the puzzle elements displayed on said 3D game field are eliminated when satisfying said elimination condition, wherein
      said location change step changes the location of puzzle elements frozen on said 3D game field.

11. The 3D puzzle game recording medium as claimed in claim 10, wherein, in said puzzle element display control step, after display data of additional puzzle elements to be displayed on said 3D game field being sequentially produced, the additional puzzle elements are displayed on said display along with the puzzle elements already on said 3D game field.

12. The 3D puzzle game recording medium as claimed in claim 11, wherein, in said puzzle element addition control step, the additional puzzle elements provided on said 3D game field are displayed in such a way as to gradually move in a predetermined direction.

13. The 3D puzzle game recording medium as claimed in claim 12, wherein, in said location change step, the location of the puzzle elements caused to move in said puzzle element addition control step is changed in response to the actuation of said controller.

14. The 3D puzzle game recording medium as claimed in claim 10, wherein, in said elimination condition detection step, on said 3D game field, when the puzzle elements of a pattern are in line in a predetermined direction over a fixed number, said given elimination condition is detected as being satisfied.

15. The 3D puzzle game recording medium as claimed in claim 10, wherein, in said elimination condition detection step, when puzzle elements having a predetermined relationship to one another are in line over a fixed number on said 3D game field, said given elimination condition is detected as being satisfied.

16. The 3D puzzle game recording medium as claimed in claim 15, wherein, in said puzzle element display control step, the patterns of the puzzle elements are varied by lines drawn thereon, and in said elimination condition detection step, when the lines drawn on the puzzle elements on said 3D game field are forming a line going around the 3D game field, said given elimination condition is detected as being satisfied.

17. The 3D puzzle game recording medium as claimed in claim 10, wherein, in said puzzle element display control step, the patterns of the puzzle elements are varied by color or design provided thereon.

18. The 3D puzzle game recording medium as claimed in claim 10, wherein, in said puzzle element display control step, the patterns of the puzzle elements are varied by shapes thereof, which are structured by plurally combining a minimum unit of shape.

19. A computer-readable medium having stored thereon a video game program adapted to be executed by a video game program executing system, the video game program which, when executed, performs steps which provide a three-dimensional puzzle game, the steps comprising:

generating puzzle element data defining attributes of puzzle elements of the three-dimensional puzzle game;

processing the puzzle element data, wherein the processing comprises determining which puzzle elements satisfy an elimination condition and eliminating the puzzle elements satisfying the elimination condition; and writing, based on the puzzle element data processing, puzzle element display data to a display memory readable by the video game program executing system to render a display in which the puzzle elements are arranged on a three-dimensional game field, wherein spaces on the three-dimensional game field having no puzzle elements are see-through, whereby puzzle elements on the side of the three-dimensional game field opposed to the see-through spaces are visible in the rendered display.

20. The computer-readable medium according to claim 19, wherein each puzzle element displayed on the three-dimensional game field has a pattern and the puzzle elements of a plurality of lined-up puzzle elements having the same pattern satisfy the elimination condition.

21. The computer-readable medium according to claim 20, wherein the plurality of lined-up puzzle elements comprise three or more puzzle elements.

22. The computer-readable medium according to claim 20, wherein a player controller is coupled to the video game program executing system and the processing of the puzzle element data further comprises processing player inputs to the player controller for changing the location of the puzzle elements on the three-dimensional game field.

23. The computer-readable medium according to claim 22, wherein the player inputs to the player controller interchange the location of two adjacent puzzle elements.

24. The computer-readable medium according to claim 23, wherein the player inputs for interchanging the location of two adjacent puzzle elements comprise positioning inputs which position a cursor to highlight two adjacent puzzle elements and interchange action inputs for interchanging locations of highlighted puzzle elements.

25. The computer-readable medium according to claim 24, wherein the cursor is stationary and the puzzle elements are moved in accordance with the positioning inputs.

26. The computer-readable medium according to claim 19, wherein the processing of the puzzle element data further comprises periodically adding new puzzle elements to the three-dimensional game field.

27. The computer-readable medium according to claim 19, wherein the processing of the puzzle element data further comprises generating data used by the video game program executing system to visually explode puzzle elements satisfying the elimination condition prior to eliminating these puzzle elements.

28. The computer-readable medium according to claim 27, wherein the generated data used by the video game program executing system to visually explode puzzle elements comprises counter setting data which sets a counter that determines the number of video frames prior to the elimination of the puzzle elements.

29. The computer-readable medium according to claim 19, wherein the three-dimensional game field extends around an outer surface of a tubular object.

30. The computer-readable medium according to claim 29, wherein the tubular object is a cylinder.

31. The computer-readable medium according to claim 29, wherein the tubular object is a polygonal tube.

32. The computer-readable medium according to claim 29, wherein the tubular object is an elliptical tube.

33. The computer-readable medium according to claim 19, wherein the processing of the puzzle element data further comprises dropping puzzle elements above eliminated puzzle elements into spaces formed by the eliminated puzzle elements.

34. The computer-readable medium according to claim 19, comprising a ROM cartridge.

35. The computer-readable medium according to claim 19, comprising an optical disc.

36. An article of manufacture comprising a cartridge and a computer-readable medium contained within the cartridge, the computer-readable medium having stored thereon a video game program adapted to be executed by a video game program executing system, the video game program which, when executed, performs steps which provide a three-dimensional puzzle game, the steps comprising:

generating puzzle element data defining attributes of puzzle elements of the three-dimensional puzzle game;

processing the puzzle element data, wherein the processing comprises determining which puzzle elements satisfy an elimination condition and eliminating the puzzle elements satisfying the elimination condition; and writing, based on the puzzle element data processing, puzzle element display data to a display memory readable by the video game program executing system to render a display in which the puzzle elements are arranged on a three-dimensional game field, wherein spaces on the three-dimensional game field having no puzzle elements are see-through, whereby puzzle elements on the side of the three-dimensional game field opposed to the see-through spaces are visible in the rendered display.

37. A three-dimensional (3D) puzzle game device in which a game proceeds as a player takes actions for puzzle elements varied in pattern displayed on a game field spreading across a display screen, the 3D puzzle game device comprising:

a controller which is actuated by the player; and image processing means for effecting program processing for a 3D puzzle game in response to actuation of the controller, and then producing image data for the 3D puzzle game for display on a display, wherein said image processing means comprises:

3D game field display control means for producing a 3D game field laterally extending around a tubular subject for display on said display;

puzzle element display control means for displaying a plurality of puzzle elements varied in pattern on said 3D game field displayed on said display;

location change means for changing, in response to the actuation of said controller, location of said puzzle elements displayed on said 3D game field;

3D game field rotation means for rotating, in response to the actuation of said controller, said 3D game field along with the puzzle elements displayed thereon;

elimination condition detection means for detecting that the location of the puzzle elements displayed on said 3D game field satisfies a given elimination condition; and elimination control means for performing a control in such a manner that the puzzle elements displayed on said 3D game field are eliminated when satisfying said elimination condition, wherein said puzzle element display control means displays see-through areas on said 3D game field where no puzzle elements are located.

38. The 3D puzzle game device as claimed in claim 37, wherein, when puzzle elements having a predetermined relationship to one another are in line over a fixed number on said 3D game field, said elimination condition detection means detects that said given elimination condition is satisfied.

39. The 3D puzzle game device as claimed in claim 38, wherein said puzzle element display control means varies the patterns of the puzzle elements according to lines drawn thereon, and said elimination condition detection means detects that, when the lines drawn on the puzzle elements on said 3D game field form a line going around the 3D game field, said given elimination condition is satisfied.

40. A three-dimensional (3D) puzzle game device in which a game proceeds as a player takes actions for puzzle elements varied in pattern displayed on a game field spreading across a display screen, the 3D puzzle game device comprising:

a controller which is actuated by the player; and image processing means for effecting program processing for a 3D puzzle game in response to actuation of the controller, and then producing image data for the 3D puzzle game for display on a display, wherein said image processing means comprises:

3D game field display control means for producing a 3D game field laterally extending around a tubular subject for display on said display;

puzzle element display control means for displaying a plurality of puzzle elements varied in pattern on said 3D game field displayed on said display;

location change means for changing, in response to the actuation of said controller, location of said puzzle elements displayed on said 3D game field;

3D game field rotation means for rotating, in response to the actuation of said controller, said 3D game field along with the puzzle elements displayed thereon;

elimination condition detection means for detecting that the location of the puzzle elements displayed on said 3D game field satisfies a given elimination condition; and elimination control means for performing a control in such a manner that the puzzle elements displayed on said 3D game field are eliminated when satisfying said elimination condition, wherein the location change means responds to an actuation of said controller relating to a rotation direction of said 3D game field the same as the 3D game field rotation means responds to the actuation of said controller.

41. The 3D puzzle game device as claimed in claim 40, wherein, when puzzle elements having a predetermined relationship to one another are in line over a fixed number on said 3D game field, said elimination condition detection means detects that said given elimination condition is satisfied.

42. The 3D puzzle game device as claimed in claim 41, wherein said puzzle element display control means varies the patterns of the puzzle elements according to lines drawn thereon, and said elimination condition detection means detects that, when the lines drawn on the puzzle elements on said 3D game field form a line going around the 3D game field, said given elimination condition is satisfied.

43. A three-dimensional (3D) puzzle game recording medium on which a program to be run by image processing means is recorded for realizing an operational environment on a 3D puzzle game device provided with a controller which is actuated by a player and the image processing means effects program processing for a 3D puzzle game in response to actuation of the controller and then produces image data for the 3D puzzle game for display on a display, when run by said image processing means, said program comprises:

a 3D game field display control step of displaying a 3D game field laterally extending around a tubular subject on said display;

a puzzle element display control step of displaying puzzle elements varied in pattern on said 3D game field;

a location change step of changing, in response to the actuation of said controller, the location of said puzzle elements on said 3D game field;

a 3D game field rotation step of rotating, in response to the actuation of said controller, said 3D game field along with the puzzle elements displayed thereon;

an elimination condition detection step of detecting the location of the puzzle elements on said 3D game field satisfying a given elimination condition; and an elimination control step of performing a control in such a manner that the puzzle elements displayed on said 3D game field are eliminated when satisfying said elimination condition, wherein said puzzle element display control step displays see-through areas on said 3D game field where no puzzle elements are located.

44. The 3D puzzle game recording medium as claimed in claim 43, wherein, in said elimination condition detection step, when puzzle elements having a predetermined relationship to one another are in line over a fixed number on said 3D game field, said given elimination condition is detected as being satisfied.

45. The 3D puzzle game recording medium as claimed in claim 44, wherein, in said puzzle element display control step, the patterns of the puzzle elements are varied by lines drawn thereon, and in said elimination condition detection step, when the lines drawn on the puzzle elements on said 3D game field form a line going around the 3D game field, said given elimination condition is detected as being satisfied.

\* \* \* \* \*